Figure 1:
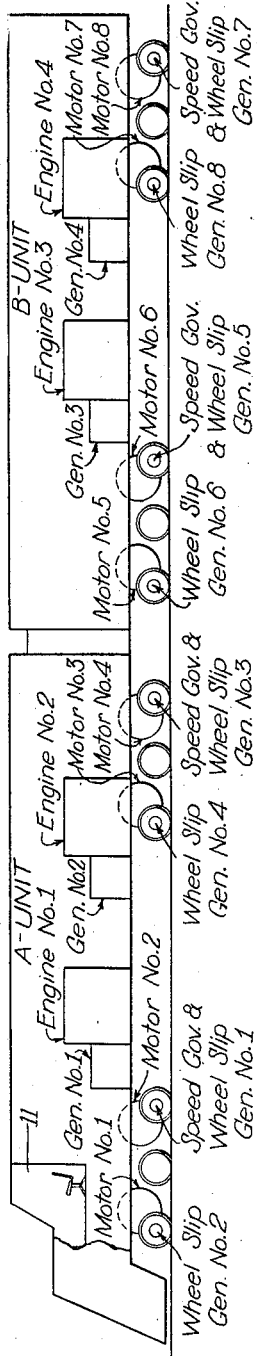

Oct. 24, 1944.          C. M. HINES          2,361,099
VEHICLE BRAKE AND PROPULSION CONTROL
Original Filed Nov. 29, 1941     4 Sheets-Sheet 1

INVENTOR
Claude M. Hines
BY
ATTORNEY

Oct. 24, 1944.   C. M. HINES   2,361,099
VEHICLE BRAKE AND PROPULSION CONTROL
Original Filed Nov. 29, 1941   4 Sheets-Sheet 3

INVENTOR
Claude M. Hines
BY
ATTORNEY

Patented Oct. 24, 1944

2,361,099

UNITED STATES PATENT OFFICE 2,361,099

VEHICLE BRAKE AND PROPULSION CONTROL

Claude M. Hines, Pittsburgh, Pa., assignor to The Westinghouse Air Brake Company, Wilmerding, Pa., a corporation of Pennsylvania Original application November 29, 1941, Serial No. 420,910, now Patent No. 2,337,717, dated December 28, 1943. Divided and this application July 30, 1942, Serial No. 452,858

9 Claims. (Cl. 192—2)

This invention relates to brake and propulsion control apparatus for vehicles, such as railway locomotives and traction cars of the Diesel-electric type, the present application being a division of my prior copending application Serial No. 420,910, filed November 29, 1941, now Patent No. 2,337,717, dated December 28, 1943, and assigned to the same assignee as the present application.

The usual Diesel-electric propulsion equipment comprises one or more Diesel engines, each of which drives a main generator that in turn supplies current to one or more traction or propulsion motors driving corresponding wheel units. A well-known method of controlling the speed of the propulsion motors is to provide a "transition" relay, which in effect is a voltage-responsive relay, controlled by the voltage delivered by the main generator. The "transition" relay together with associated apparatus automatically effects the necessary changes in the connections to the propulsion motors successively from a "Series" connection to a "Parallel" connection and then to a "Reduced Field" connection in accordance with the variations of the voltage delivered by the main generator.

It is an object of my present invention to provide a novel propulsion and brake control apparatus for cars and trains of the Diesel-electric type, characterized by an arrangement in which the connections of the propulsion motors in either a Series, Parallel or Reduced Field connection during propulsion or the degree of braking effect provided by the motors acting as dynamic brakes during braking is controlled by a common governor mechanism responsive to the speed of travel of a car or train.

It is another object of my invention to provide a combined propulsion and brake control system for Diesel-electric cars and trains of the type indicated in the foregoing object and further characterized by an arrangement utilizing the governor mechanism for preventing the propulsion motors from being effective as dynamic brakes as long as the car or train travels at a speed exceeding a certain speed. Due to the high speed of travel of Diesel-electric cars and trains, a dynamic braking current produced in the propulsion motors at high speed is of such a degree as to overheat and possibly cause burnout of the armature windings of the motors. The attainment of the foregoing object prevents such occurrence.

It is another object of my invention to provide a combined propulsion and brake control system for Diesel-electric cars and trains of the type indicated in the foregoing objects, and further characterized in that the governor mechanism coordinates the operation of the fluid pressure brakes and the dynamic brakes.

It is another object of my invention to provide a combined propulsion and brake control system for Diesel-electric cars and trains of the type mentioned in the foregoing objects, and further characterized by an arrangement wherein the application of the dynamic brakes is automatically controlled according to the speed of the car or train and wherein the application of the fluid pressure operated brakes is controlled jointly according to the speed of the vehicle and the degree of application of the dynamic brakes.

It is another object of my invention to provide a combined propulsion and brake control system for Diesel-electric cars and trains of the type mentioned in the foregoing objects and further characterized by an arrangement including the governor mechanism responsive to the speed of the car or train for controlling the degree of application of the dynamic brakes in a manner to regulate the speed of the car or train to a substantially uniform speed on a long descending grade without employing the fluid pressure brakes. On long descending grades, the continued application of the brake shoes of fluid pressure brakes to the rims of the wheels is apt to cause overheating of the shoes, resulting in impairment of the braking effectiveness thereof and possibly total destruction thereof. The attainment of the just mentioned object precludes such a possibility by avoiding the necessity for the use of fluid pressure brakes in the circumstances described.

The above objects, and other objects of my invention which will be made apparent hereinafter, are attained in several embodiments of my invention hereinafter to be described and shown in the accompanying drawings wherein Figure 1 is a diagrammatic view of a typical Diesel-electric vehicle, showing the manner in which a plurality of Diesel-electric power plants are connected or associated with corresponding driving wheels, Figures 2 and 3, taken together, are a diagrammatic view of a control system for an individual Diesel-electric power plant embodying my invention, and Figures 4 and 5, taken together, are a diagrammatic view of a modified control system for a Diesel-electric power plant embodying my invention.

DESCRIPTION

(a) In general

Referring to Figure 1, there is illustratively shown a typical Diesel-electric locomotive installation comprising two cars or units designated A and B, respectively, each unit having two wheel trucks at opposite ends thereof. Each wheel truck has three pairs of wheel units, the wheels of each pair being fixed on opposite ends of a connecting axle, only one wheel of each pair being visible in the drawings.

The leading and trailing wheel units of each truck are suitably geared to a corresponding propulsion motor. In the case of the A unit, the motors are correspondingly designated No. 1, No. 2, No. 3, and No. 4. In the case of the B unit the motors are designated No. 5, No. 6, No. 7, and No. 8.

An individual power plant for each pair of motors is provided comprising a Diesel-engine and a generator driven thereby. As will be apparent in the drawings the power plant for motor No. 1 and No. 2 comprises an engine No. 1 and generator No. 1. The power plant for motors No. 3 and No. 4 comprises engine No. 2 and generator No. 2. The power plant for motors No. 5 and No. 6 comprises engine No. 3 and generator No. 3. The power plant for motors No. 7 and No. 8 comprises engine No. 4 and generator No. 4.

Figure 2:
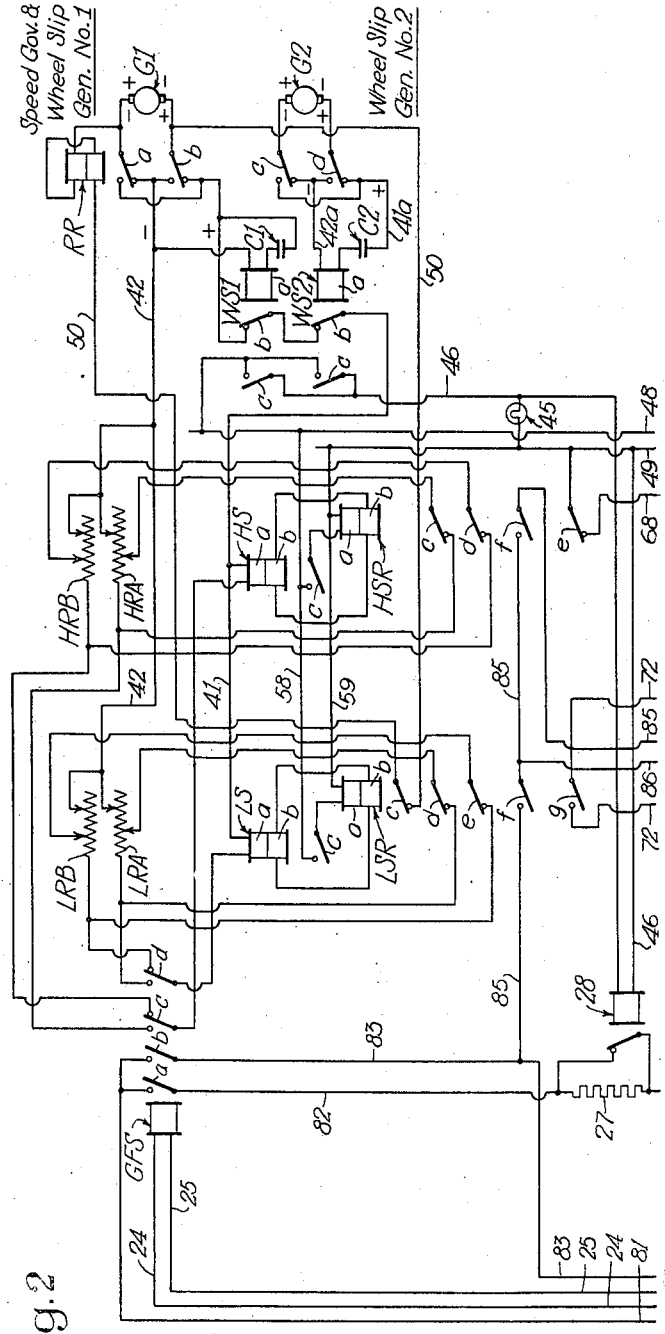
Figure 3:
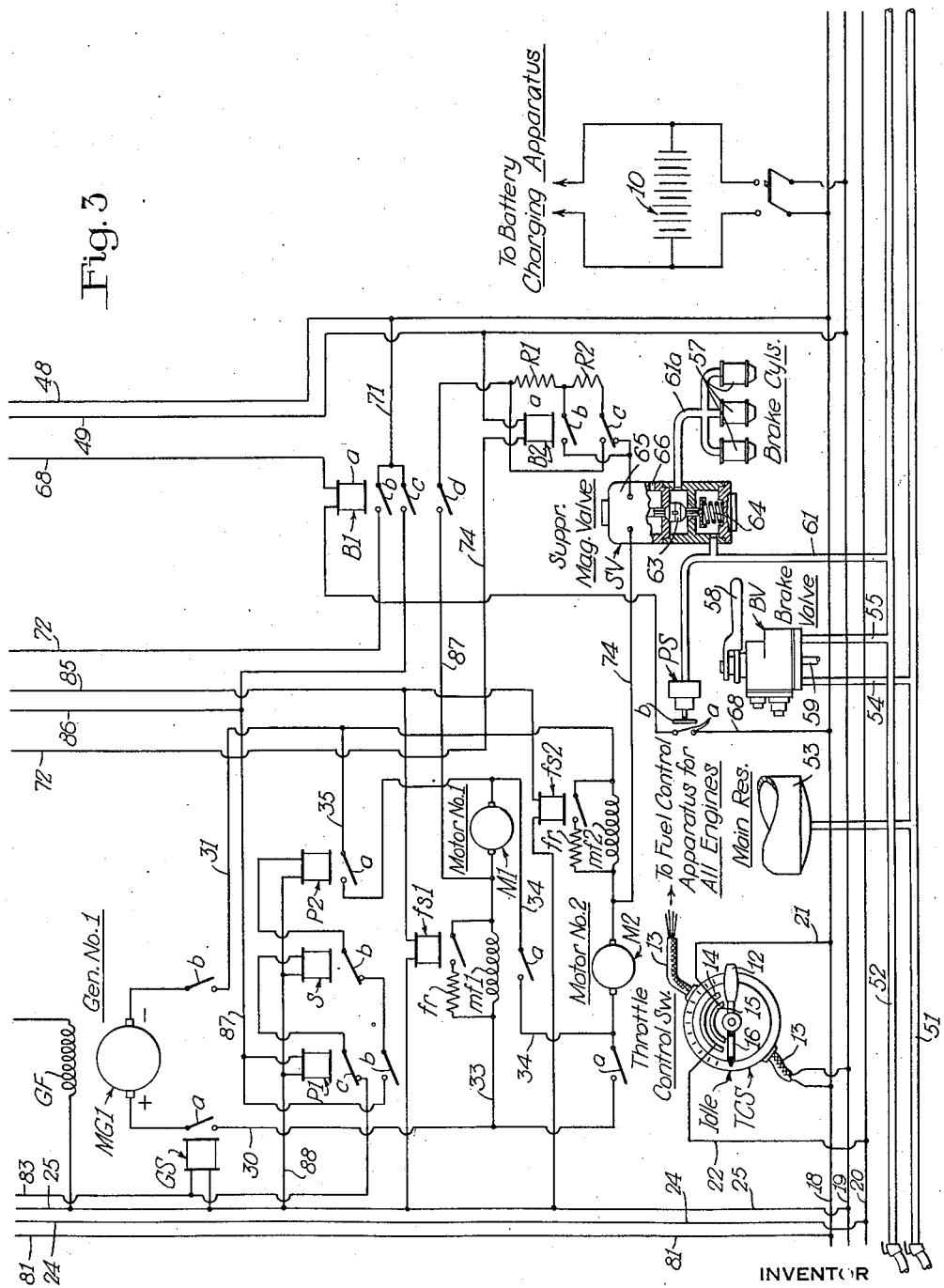

The power plant and motors for each wheel truck have similar control apparatus, that shown in Figures 2 and 3 being representative of all but specifically for engine No. 1, generator No. 1 and motors No. 1 and No. 2.

As will be described hereinafter in connection with Figures 2 and 3, all of the engines, that is engines Nos. 1, 2, 3, and 4, are controlled by the operator from a control station 11 and the A unit by means of a throttle control switch designated TCS.

According to my invention, the leading and trailing wheel unit of each wheel truck has a direct-current generator associated therewith in a manner to provide a voltage substantially proportional to the rotational speed of the wheel unit. One of such generators, namely that for the trailing wheel units, is designated the Speed Governor and Wheel-Slip generator and the other generator for each wheel truck is designated simply a Wheel-Slip generator. Thus on the A unit, a speed governor and wheel-slip generator No. 1 is associated with the trailing wheel unit and a wheel-slip generator No. 2 is associated with the leading wheel unit. In a similar manner the other truck of the A unit is provided with a speed governor and wheel-slip generator No. 3 in association with the trailing wheel unit and a wheel-slip generator No. 4 in association with the leading wheel unit.

The wheel units of the B unit are similarly provided with speed governor and wheel-slip or wheel slip generators designated generators Nos. 5, 6, 7, and 8.

The governor and wheel-slip generators No. 1 to No. 8 may be mounted in any suitable manner and arranged to be driven according to the rotation of the corresponding wheel unit in any suitable manner. For simplicity these governor and wheel-slip generators are diagrammatically shown as associated directly with the axles of the wheel units and it will be assumed that they are driven either directly or through suitable gearing by rotation of the axle of the wheel unit.

The function of the various governor and wheel-slip generators Nos. 1 to 8 will be made clear in connection with the subsequent description of the control equipment shown in Figures 2 and 3.

(b) Propulsion control apparatus

In Figures 2 and 3, I have shown in simplified diagrammatic form the essential parts of the control system which I have devised for controlling the propulsion motors during propulsion and during braking as well as for controlling the fluid pressure operated brakes during braking. I have purposely omitted various details which are necessary in the actual installation and operation of the apparatus. For example, I have omitted commutating and starting field windings for the main generator designated generator No. 1 but it will be understood however that such windings are intended to be provided in the actual installation. The starting field winding and associated control is necessary in order to initially cause each main generator such as generator No. 1 to act as a motor to crank its corresponding Diesel-engine. Since such starting control is well known and since it is not directly related to the substance of my invention, I have omitted such details from the drawings.

As previously indicated, all of the Diesel engines, namely engines Nos. 1 to 4 are under the common control of a throttle control switch TCS located in the control cab 11 on the A unit. Throttle control switch TCS comprises an operating handle 12 which is affixed to the shaft of a rotary contact drum and which is effective to rotate the drum to different control positions. The control drum of the throttle control switch is adapted to establish suitable electrical control through a cable 13 leading to various electroresponsive devices for controlling the supply of fuel to the various engines in accordance with the displacement of the operating handle 12 in a clockwise direction out of the "Idle" position in which it is shown. Since the particular mechanism and apparatus whereby the throttle control switch controls the supply of fuel to the engines Nos. 1, 2, 3, and 4 is not a part of my invention, it has been omitted from the drawings.

The throttle control switch TCS is effective when operated out of the Idle position thereof to initiate operation of the propulsion motors, namely motor No. 1 and motor No. 2, and for this purpose it is provided with a switch device which is opened when the handle 12 is in the Idle position but which is closed in all other advanced positions of the handle. This switch device is diagrammatically shown in Figure 3 as comprising a pair of arcuate concentrically arranged insulated contact segments 14 and 15 carried by the casing of the throttle control switch and adapted to be bridged by a contact 16, carried in insulated relation on the operating handle 12, whenever the handle 12 is advanced in a clockwise direction out of its Idle position.

Generator No. 1, which is driven by Diesel engine No. 1, comprises an armature winding MG1 and a separately excited shunt field winding GF.

The circuit of energizing the field winding GF is under the control of a relay GFS which in turn is under the control of the switch device of throttle control switch TCS. In order for the throttle control switch TCS to control the relay GFS for each power plant associated with each wheel truck, a multiple unit type of control is provided including three train wires 18, 19, and 20, hereinafter respectively referred to as the positive battery wire, the negative battery wire, and the throttle control wire. These wires extend throughout both the A unit and the B unit in the usual manner of train wires. The positive battery wire 18 and the negative battery wire 19 are connected respectively to the positive and negative terminals of a suitable source of direct-current voltage, such as a storage battery 10 which is maintained charged by a suitable battery charging apparatus not shown. If desired, a plurality of batteries corresponding to the battery 10 may be provided, one for each power plant, the positive and negative terminals of each battery being connected to the positive and negative train wires 18 and 19 respectively.

The arcuate contact segment 15 of the switch device associated with the throttle control switch TCS is connected by a wire 21 to the positive battery wire 18 while the contact segment 14 is connected by a wire 22 to the throttle control wire 20. One terminal of the winding of each relay GFS is connected by a wire 24 to the throttle control wire 20 and the terminal is connected by a wire 25 to the negative battery wire 19.

It will thus be apparent that the circuit for energizing the winding of the relays GFS is interrupted with the handle of the throttle control switch TCS in its Idle position and is closed whenever the operating handle 12 of the throttle control switch TCS is advanced out of its Idle position.

Relay GFS has two front contacts $a$ and $b$ and two transfer contacts $c$ and $d$. The front contacts $a$ and $b$ are in their dropped-out or open position when the winding of the relay is deenergized and are actuated to their picked-up or closed position upon energization of the winding of the relay.

The transfer contacts $c$ and $d$ act as back contacts when the winding of the relay is deenergized and as front contacts when the relay is energized.

The contact $a$ of relay GFS is effective in its picked-up position to establish a circuit for energizing the winding GF of generator No. 1. The circuit for the field winding GF includes a resistor 27 which is normally shunted by the single back contact of a relay 28. The relay 28 is controlled in response to the slipping of either the leading or the trailing wheel units of the truck in the manner hereinafter to be specifically described and is effective upon slipping to remove the shunt from around the resistor 27, thereby increasing the resistance in the circuit of the field winding GF and correspondingly reducing the voltage delivered by the generator.

Contact $b$ of the relay GFS controls the winding of a relay GS. The relay GS has two contacts $a$ and $b$ which respectively control the connections of two bus wires 30 and 31 to the positive and negative terminals of the armature winding MG1 of generator No. 1.

Motor No. 1 comprises an armature winding M1 and a series field winding $mf1$. Motor No. 2 comprises an armature winding M2 and a series field winding $mf2$.

A relay S is provided which is effective, when the winding thereof is energized, for connecting the armature and field windings of motor No. 1 and motor No. 2 in series across the bus wires 30 and 31.

A pair of relays P1 and P2 are provided which are jointly effective to cause connection of the armature and field windings of motor No. 1 and motor No. 2 in parallel relation across the bus wires 30 and 31.

The relay S has a front contact $a$ and a back contact $b$. With the contacts $a$ and $b$ of relay GS in their picked-up or closed positions the circuit whereby the motor No. 1 and motor No. 2 are connected in series relation across the terminals of the generator No. 1 may be traced from the positive or left-hand terminal of the armature winding MG1 of generator No. 1, contact $a$ of relay GS, bus wire 30, wire 33, field winding $mf1$, armature winding M1, a wire 34 including contact $a$ of relay S, armature winding M2, field winding $mf2$, bus wire 31, contact $b$ of relay GS to the negative or right-hand terminal of the armature winding MG1.

The back contact $b$ of relay S is an interlock contact in the circuit of the winding of the relay P2 for preventing energization of the winding of this relay when the relay S is picked-up.

The relay P1 has two front contacts $a$ and $b$ and a back contact $c$. The relay P2 has a single front contact $a$.

Back contact $c$ of relay P1 is an interlock contact in the circuit of the winding of the relay S and is effective upon pick-up to interrupt the circuit for energizing the winding of the relay S to cause drop-out thereof.

Front contact $b$ of relay P1 is effective jointly with the back contact $b$ of relay S to control the circuit for energizing the winding of the relay P2. It will thus be apparent that when the winding of the relay P1 is energized, the winding of the relay S is first deenergized and then the winding of the relay P2 is energized.

With the contacts of both relays P1 and P2 picked-up the circuit for connecting the armature and field windings of motor No. 1 and motor No. 2 in parallel relation across the bus wires 30 and 31 is established. This circuit extends from the positive terminal of the armature winding MG1 of generator No. 1, through contact $a$ or relay, GS to bus wire 30 where the circuit divides into two branches, the one branch extending by way of contact $a$ of relay P1, armature winding M2, field winding $mf2$ to the bus wire 31 and thence to the negative terminal of the armature winding MG1 of the generator No. 1 and the other branch extending by way of wire 33, field winding $mf1$, armature winding M1 and a wire 35 including contact $a$ of relay P2 to the bus wire 31 and thence to the negative terminal of armature winding MG1.

Associated with the motor field winding $mf1$ is a shunting resistor $fr$ and a shunting contactor $fs1$. The contactor $fs1$ has a single front contact which is effective when actuated to its picked-up or closed position in response to energization of the winding of the contactor to connect the shunting resistor $fr$ in shunt relation to the winding $mf1$.

In a similar manner a shunting contactor $fs2$ provided having a single front contact is effective when actuated to its picked-up or closed position in response to energization of the winding of the contactor to connect a shunting resistor $fr$ in parallel with the field winding $mf2$ of motor No. 2.

When the field windings $mf1$ and $mf2$ are shunted by the corresponding resistors $fr$, the excitation of the winding is diminished and the current through the armature winding correspondingly increased to effect a corresponding increase in the speed of the motor in well known manner.

Relays S, P1 and P2 and the contactors $fs1$ and $fs2$ are suitably controlled, in the manner presently to be described, so as to cause sequential connection of the motor No. 1 and motor No. 2 in series, then in parallel and finally with the field winding shunted as the speed of the vehicle increases.

The speed control apparatus for controlling relays S, P1 and P2 and contactors fs1 and fs2 comprises the hereinbefore referred to speed governor and wheel-slip generator No. 1, two voltage-responsive relays of the unidirectional type designated LS and HS, and two repeater relays LSR and HSR respectively controlled by the relays LS and HS.

The speed governor generator No. 1 preferably has a permanent magnet field core not requiring any shunt field winding. The rotary armature G1 has a voltage generated therein substantially proportional to the rotational speed of the corresponding wheel unit. The terminals of the generator armature G1 are automatically and selectively connected to a pair of bus wires 41 and 42 in accordance with the direction of rotation of the corresponding wheel unit under the control of a reversing relay RR of the polarized type.

The reversing relay RR has two transfer contacts $a$ and $b$. These contacts are actuated to their lower positions in which they are shown in response to flow of current through the winding of the relay RR in one direction and maintained therein once actuated thereto until the direction of flow of current through the windings reverses. Upon reversal of the current through the windings of the relay RR, the contacts $a$ and $b$ are actuated to their raised positions and thereafter maintained therein independently of subsequent deenergization of the winding until the direction of the flow of current through the windings is subsequently reversed.

The circuit for energizing the winding of the reversing relay RR will be traced hereinafter, but it may here be noted that when the vehicle or train is traveling in a forward direction the polarity of the terminals of the armature G1 is such as to cause the contacts $a$ and $b$ of the reversing relay RR to be actuated to the lower position in which they are shown. Upon reverse travel of the vehicle, the polarity at the terminals of the generator armature G1 reverses and the contacts $a$ and $b$ of the relay RR are correspondingly actuated to their raised position.

It will thus be seen that notwithstanding a reversal in the direction of rotation of the wheels driving the armature G1, the reversing relay RR automatically maintains a constant polarity of the bus wires 41 and 42. For purposes of the present invention it will be assumed that the bus wire 41 is always of positive polarity whereas the bus wire 42 is always of negative polarity, Each of the so-called speed relays LS and HS comprises an upper winding $a$ and a lower winding $b$ and a single front contact $c$.

The winding $a$ of the relay LS is arranged to be connected across the bus wires 41 and 42 alternatively in series with either of two resistors LRB or LRA in the dropped-out and picked-up positions, respectively, of the transfer contact $d$ of the relay GFS.

In a similar manner, the winding $a$ of the relay HS is arranged to be connected across the bus wires 41 and 42 in series relation alternatively with a resistor HRB or a resistor HRA in the dropped-out and picked-up positions, respectively, of the transfer contact $c$ of the relay GFS.

The resistors LRA, LRB, HRA, and HRB are provided for the purpose of causing the speed relays LS and HS to be picked-up in response to different voltages corresponding to different speeds of travel of the vehicle and each of the resistors is of correspondingly different value because the windings of the relays are identical in design.

Resistor LRB is adjustable so as to provide such a resistance as to cause the contact $c$ of relay LS to be picked-up during braking whenever the voltage delivered by the speed governor generator No. 1 is above a certain value corresponding to a certain vehicle speed, such as twenty miles per hour.

Resistor HRB is adjusted to provide such a resistance as to cause the contact $c$ of the relay HS to be actuated to its picked-up position during braking whenever the voltage delivered by speed governor generator No. 1 is above a certain value corresponding to a certain speed of travel of the vehicle, such as thirty-five miles per hour.

Resistor LRA is adjusted to provide such a resistance as to cause pick-up of the contact $c$ of relay LS during propulsion whenever the voltage supplied by the speed governor generator No. 1 exceeds a certain value corresponding to a speed of travel of the vehicle of, for example, thirty-five miles per hour.

Resistor HRA is adjusted to provide such a resistance as to cause pick-up of the contact $c$ of the relay HS during propulsion whenever the voltage delivered by the speed governor generator No. 1 increases above a certain value corresponding to a speed of travel of the vehicle of, for example, eighty miles per hour.

It will thus be apparent that relay LS is picked-up during a brake application as long as the speed of the vehicle exceeds twenty miles per hour whereas it is picked-up only when the speed of the vehicle increases above thirty-five miles per hour during propulsion of the vehicle. It will also be apparent that relay HS is picked-up as long as the speed of the vehicle exceeds thirty-five miles per hour during a brake application whereas it is picked-up only when the speed of the vehicle increases above eighty miles per hour during propulsion of the vehicle.

The repeater relays LSR and HSR are similar to the relays LS and HS. The relay LSR has an upper winding $a$, a lower winding $b$, three back contacts, $c$, $d$, and $e$, and two front contacts $f$ and $g$. The relay HSR has an upper winding $a$, a lower winding $b$, three back contacts, $c$, $d$, and $e$ and one front contact $f$.

Contact $b$ of relay LS is effective when actuated to its picked-up or closed position to connect the upper winding $a$ of the repeater relay LSR across two bus wires 58 and 59, which are connected respectively to bus wires 48 and 49, that are, in turn, connected to the positive battery wire 18 and the negative battery wire 19 respectively. It will thus be seen that the winding $a$ of the relay LSR is energized whenever the contact $b$ of the relay LS is actuated to its picked-up position.

In a similar manner, the contact $c$ of relay HS is effective when actuated to its picked-up or closed position to connect the winding $a$ of relay HSR across the bus wires 58 and 59 to cause energization thereof.

The lower winding $b$ of the relay LS and the lower winding $b$ of the relay LSR are connected in series in a loop circuit. In a similar manner the lower winding $b$ of relay HS and the lower winding $b$ of the relay HSR are also connected in series in a loop circuit.

The purpose of the loop circuit connecting the windings b of these relays is to insure positive pick-up and positive drop-out operation of the contacts c of relays LS and HS.

The connections between the winding b of each of the relays LS and HS and the corresponding winding b of relays LSR and HSR are such that whenever the winding a of either of the relays LSR and HSR is energized in response to pick-up of the contact of the corresponding relay LS and HS, a momentary voltage is induced in the winding b of the relays LSR and HSR which is of such polarity as to cause a flow current in the corresponding loop circuit and the winding b of the corresponding relay LS and HS in a direction to assist the winding a thereof in picking-up the contact of the relay, thereby causing positive operation and preventing a fluttering thereof.

Conversely, when the contact c of either relay LS or HS is restored to its dropped-out or open position effecting deenergization of the winding a of corresponding relays LSR and HSR, a voltage is momentarily induced in the lower winding b of relays LSR and HSR which is of such polarity as to cause a flow of current in the opposite direction to oppose the effect of the current energizing the winding a. By opposing the effect of the winding a, the momentary energization of the winding b of the relays LS and HS is effective to cause the positive drop-out of the contact of the relays LS and HS, thereby preventing a fluttering of the contact and a consequent burning thereof.

As is well known, it requires a greater current to cause the contacts of a relay to be initially picked-up than to maintain the contacts picked-up due to the fact that the reluctance of the magnetic flux path in the core of the relay is reduced whenever the armature is picked-up. In order, therefore, to cause the speed relays LS and HS to be picked-up and dropped-out substantially at the same speed, whether increasing or decreasing, a portion of resistors LRA and LRB is normally shunted by the back contacts d and e respectively of the repeater relay LSR. These shunt connections are opened in response to the pick-up of the contacts d and e of the relay LSR, thereby to cause the insertion of additional resistance in circuit with the winding a of the relay LS. Thus the contact c of the relay LS is picked-up at a certain voltage delivered to the bus wires 41 and 42 and dropped-out at substantially the same voltage the voltage being different depending upon whether resistor LRA or resistor LRB is effective. In view of the fact that the voltage on the bus wires 41 and 42 is substantially proportional to the speed of the vehicle, it will be seen that the relay LS is picked-up and dropped-out at either of two different speeds, whether the speed of the vehicle is increasing or decreasing, depending upon which of the two resistors LRA and LRB is effective.

In a similar manner, the back contacts c and d of the repeater relay HSR normally shunt a portion of resistors HRA and HRB respectively, each shunt connection being opened to cause the insertion of additional resistance in circuit with the winding a of the relay HS in response to the pick-up of the contacts of repeater relay HSR. It will thus be seen that assuming either of the associated resistors to remain effective whenever the relays LS and HS are picked-up, the relays are automatically conditioned so as to drop-out at substantially the same speed at which they were picked-up.

It should be understood that the above-described arrangement for insuring pick-up and drop-out of the speed relays LS and HS at the same speed, whether the speed of the vehicle is increasing or decreasing, as well as the arrangement for causing the positive pick-up and drop-out of the contacts of the relays LS and HS, are not in themselves my invention, being disclosed and claimed in Patent No. 2,257,311 to Andrew J. Sorenson.

Contact c of the relay LSR is connected in series relation with the windings of the reversing relay RR in a wire 50 connected across the terminals of the armature winding G1 of speed governor generator No. 1. In view of the fact, as previously pointed out, that the contacts of the reversing relay RR remain in a position corresponding to the direction of flow of current through the windings last energizing the windings until the direction of flow of current is reversed, it will be apparent that it is unnecessary to maintain the windings of the reversing relay RR energized continuously since they constitute an additional load on the governor generator No. 1. Accordingly since the contact c of the relay LSR is actuated to its picked-up or open position at a speed in excess of thirty-five miles per hour during propulsion of the vehicle, it will be seen that the winding of the relay RR is ordinarily normally deenergized after the relay is conditional in accordance with the direction of rotation of the vehicle wheels. Since the relay LSR does not drop out until the speed of the vehicle decreases below twenty miles per hour during a brake application, it will be apparent that the circuit for energizing the windings of the relay RR is maintained correspondingly open when the vehicle is being brought to a stop in response to a brake application.

Contact f of relay LSR is effective to control energization and deenergization of the windings of the relays P1 and P2 in the manner hereinafter to be described.

Contact f of the relay HSR is effective jointly with the contact f of the relay LSR to control the contactors fs1 and fs2 in the manner to be hereinafter specifically described.

(c) Wheel-slip control apparatus

If the wheels with which the speed governor generator No. 1 is associated slip, that is lose traction, during propulsion of the vehicle, the generator will supply a voltage in accordance with the increased speed of rotation of the wheels which is much greater than the actual speed of the vehicle. If the speed relays LS and HS were permitted to respond to the false speed indication, they would operate to cause corresponding changes in the connections of motor No. 1 and motor No. 2 from the Series to the Parallel or to the Reduced Field connection. Such changes in the connections of motor No. 1 and motor No. 2 are undesirable and accordingly two wheel-slip relays WS1 and WS2 are provided for interrupting the energizing circuit for the winding a of the speed relays LS and HS whenever slipping of the wheels driven by motor No. 1 or motor No. 2 occurs.

The wheel-slip relays WS1 and WS2 are of the uni-directional type, that is they are operative to a picked-up position only in response to a current in one direction through the winding thereof exceeding a certain value. Each of these relays comprises a winding $a$, a back contact $b$ and a front contact $c$.

The winding $a$ of the relay WS1 is connected in series with a condenser C1 across the bus wires 41 and 42.

The winding $a$ of the relay WS2 is connected in series with a condenser C2 across a pair of bus wires 41a and 42a which are, in turn, connected to the terminals of the armature winding G2 of wheel-slip generator No. 2 under the control of transfer contacts $c$ and $d$ of the reversing relay RR.

The arrangement of the windings of the relays WS1 and WS2 with the corresponding condensers C1 and C2 is such that the current supplied to charge the condensers in response to an increasing voltage supplied by the governor and wheel-slip generator No. 1 and wheel-slip generator No. 2 corresponds substantially to the rate of acceleration of the corresponding vehicle wheels. The connections of the windings $a$ of the relays WS1 and WS2 are such that the current supplied to charge the condensers associated therewith is in the proper direction to cause pick-up of the contacts of the relays. Moreover, the windings are so designed that unless the current supplied to charge the condensers exceeds a certain value, corresponding to a certain rate of acceleration of the vehicle wheels occurring only when the wheels slip, the contacts of the relays are not actuated to their picked-up position.

Conversely, when the voltage delivered by the governor and wheel-slip generators No. 1 and No. 2 decreases in response to the reduction in rotational speed of the corresponding vehicle wheels, current is discharged from the condensers through the windings of the relays WS1 and WS2 in a reverse direction. Since the direction of flow of current discharged from the condensers is opposite to that required to cause pick-up of the contacts of the relays, the contacts of the relays remain in their dropped-out position or are restored to their dropped-out position whenever the voltage delivered by the governor and wheel-slip generators No. 1 and No. 2 decreases in response to the deceleration of the vehicle wheels corresponding thereto.

It will be apparent that due to the fact that the polarity of the voltage impressed on the bus wires 41 and 42 as well as on the bus wires 41a and 42a remains constant, notwithstanding a reversal of polarity of the voltage supplied by the governor and wheel-slip generators No. 1 and No. 2 due to the reversal in the direction of rotation of the corresponding vehicle wheels, the wheel-slip relays WS1 and WS2 operate in the same manner for either direction of rotation of the vehicle wheels.

The back contacts $b$ of the two relays WS1 and WS2 are connected in series relation in the bus wire 41. Accordingly, whenever either of the relays is picked-up in response to slipping of the corresponding vehicle wheels, the circuit for energizing the upper windings $a$ of the speed relays LS and HS is interrupted and consequently the contacts of these relays are restored to their dropped-out position which, in turn, results in the restoration of the contacts of the corresponding repeater relays LSR and HSR to their dropped-out positions.

Obviously, if neither of the relays LS or HS is picked-up, then the pick-up of either of the wheel-slip relays WS1 and WS2 is effective to prevent pick-up of these relays in response to the increasing voltage delivered by the speed governor generator No. 1.

The back contacts $c$ of the wheel-slip relays WS1 and WS2 are severally effective to control the winding of the field shunting relay 28 and an indicating lamp 45. This circuit may be traced from the branch wire 48 of the positive battery wire 18, in parallel through the two contacts $c$ of the relays WS1 and WS2 to a wire 46, thence in parallel through the indicating lamp 45 and the winding of the relay 28 to the branch wire 49 of the negative battery wire 19.

Accordingly, as long as either of the wheel-slip relays WS1 or WS2 is picked-up, the indicating lamp 45 is illuminated to indicate the slipping condition of the corresponding vehicle wheels and the contact of the relay 28 is picked-up to remove the shunt connection around the resistor 27 in the circuit of the field winding GF of main generator No. 1.

The insertion of the resistor 27 in the circuit of the field winding GF of main generator No. 1 effects a substantial reduction in the degree of excitation of the generator field winding GF and a consequent substantial reduction in the voltage delivered by generator No. 1. Current supplied to the motors No. 1 and No. 2 is thus correspondingly diminished so as to cause a correspondingly prompt restoration of the slipping wheels back to a speed corresponding to vehicle speed.

(d) *Brake control apparatus*

The invention further comprises apparatus for controlling the fluid pressure operated brakes as well as apparatus for controlling the connection of motors No. 1 and No. 2 so as to act as dynamic brakes.

The fluid pressure operated brake equipment is illustrated in simplified form as of the straight-air type but it will be understood that in actual practice the more usual combination of conventional automatic and straight-air brake equipments in present day use on high speed trains is contemplated.

As shown, the fluid pressure operated brake equipment includes two train pipes 51 and 52, hereinafter designated the supply pipe and the control pipe respectively; a reservoir 53, referred to hereinafter as the main reservoir and constantly connected to the supply pipe 51 to cause it to be charged to the normal pressure carried in the reservoir or some percentage thereof; a brake valve BV having branch pipes 54 and 55 connecting it to the supply pipe 51 and control pipe 52 respectively and effective to control the pressure in the control pipe; one or more brake cylinders 57, three being shown for purposes of illustration, one for each wheel unit of a given truck, effective to cause application of the brakes in response to the supply of fluid under pressure thereto and to cause release of the brakes in response to the release of fluid under pressure therefrom; a suppression magnet valve SV interposed between the brake cylinders 57 and the control pipe 52 for the purpose of controlling or preventing the supply of fluid under pressure to the brake cylinders as long as the degree of application of the dynamic brakes exceeds a certain degree; and a pressure operated switch PS operatively responsive to the pressure in the control pipe 52.

Brake valve BV is of the self-lapping type described and claimed in Patent 2,042,112 to Ewing K. Lynn and Rankin J. Bush and reference may be had to this patent for a complete description of the brake valve. Briefly, the brake valve BV comprises an operating handle 58 shiftable in a horizontal plane to correspondingly rotate a rotary operating shaft controlling the operation of supply and release valves of the self-lapping type. With the brake valve handle 58 in its normal or brake release position, the release valve is open and the supply valve is closed so that fluid under pressure is accordingly vented to the atmosphere from the control pipe 52 through the branch pipe 55 and an exhaust port and pipe 59 at the brake valve. As the brake valve handle 58 is shifted out of its brake release position into its application zone, the release valve is closed and the supply valve is opened, so that fluid under pressure is correspondingly supplied from the supply pipe 51 through the branch pipe 54 and 55 to the control pipe 52, the supply valve being automatically seated when the pressure attained in the control pipe reaches a value substantially proportional to the degree of displacement of the brake valve handle 58 out of its brake release position. Accordingly, the pressure established in the control control pipe 52 is varied substantially in proportion to the degree of displacement of the brake valve handle out of its brake release position.

If the pressure in the control pipe 52 tends to reduce for any reason, such as leakage, the valve mechanism of the brake valve operates automatically to supply fluid under pressure to the control pipe to maintain a pressure therein corresponding to the position of the brake valve handle.

Fluid under pressure is supplied from the control pipe 52 to a branch pipe 61 to which the pressure operated switch PS is connected. The brake cylinders 57 are connected to the pipe 61 by a branch pipe 61a in which the suppression magnet valve SV is interposed.

The pressure operated switch PS may be of the snap-acting type described and claimed in Patent 2,096,492 to E. E. Hewitt. Briefly, it comprises a pair of stationary insulated contacts a, a movable contact b, and mechanism for actuating the movable contact b into and out of engagement with the contacts a in response to variation of pressure in the control pipe 52 from below to above a certain critical pressure and from above to below such pressure, respectively. For purposes of the present invention it is assumed that when the pressure in the control pipe 52 increases above five pounds per square inch, the contact b of the pressure switch PS is actuated into contact with the associated contacts a, and remains in such position until the pressure in the control pipe 52 reduces below five pounds per square inch, at which time it is actuated out of engagement therewith.

The suppression magnet valve SV is of standard type having a double beat valve 63 which is biased to an upper seated position by a spring 64 and which is actuated to a lower seated position in response to energization of a magnet winding or solenoid 65. In its upper seated position, the valve 63 establishes communication through the branch pipe 61a from the pipe 61 to the brake cylinders 57, thereby permitting variation of the pressure in the brake cylinders in accordance with variations of the pressure in the control pipe 52. In its lower seated position, communication through the branch pipe 61a is interrupted and communication established for exhausting fluid under pressure from the brake cylinders through an exhaust port 66.

The apparatus for controlling the connection of the motor No. 1 and the motor No. 2 to act as dynamic brakes and for controlling the degree of such dynamic brake application comprises two contactors B1 and B2.

The contactor B1 comprises a winding a and three front contacts c, d, and e respectively.

The winding a of contactor B1 is energized under the joint control of the pressure operated switch PS and the back contact e of the repeater relay HSR. The circuit for energizing the winding of the contactor B1 is traced from the positive battery wire 18 by way of a wire 68 including in series relation therein the contacts of the pressure switch PS, the winding a of the contactor B1, and back contact e of the relay HSR to the wire 49 and thence to the negative battery wire 19.

The contactor B2 comprises a winding a, a front contact b and a transfer contact c.

Contact b of contactor B1 and the contact g of the relay LSR are jointly effective to control the winding a of the contactor B2. The circuit for energizing the winding a of contactor B2 may be traced from the positive battery wire 18 by way of the wire 48, a branch wire 71, contact b of contactor B1, a wire 72 including the contact g of relay LSR and the winding a of contactor B2 in series relation, to the wire 49 and thence to the negative battery wire 19.

Contact c of contactor B1 is effective in its picked-up or closed position to establish a circuit for energizing the winding of the relay P1, which in turn causes energization of the relay P2, thereby connecting motor No. 1 and motor No. 2 in parallel for dynamic brake operation. This operation will be described more specifically hereinafter in connection with an assumed operation.

With the transfer contact c of contactor B2 in its dropped out or lower position as shown, the actuation of the contact d of contactor B1 to its picked-up or closed position establishes a dynamic braking circuit for motor No. 1 and motor No. 2 acting as generators. The dynamic braking circuit may be traced from the point between the armature winding M1 and field winding mf1 of motor No. 1, by way of a wire 74 including in series relation therein contact d of contactor B1, dynamic braking resistors R1 and R2 in series relation, contact c of contactor B2 and the winding 65 of the suppression magnet valve SV to the point between the armature winding M2 and the field winding mf2.

When the contacts of contactor B2 are actuated to their picked-up position, they connect the dynamic braking resistors R1 and R2 in parallel relation instead of in series relation in the dynamic braking circuit.

OPERATION OF EMBODIMENT SHOWN IN FIGS. 2 AND 3

(a) Propulsion

In describing the operation of the equipment, only the specific equipment shown in Figs. 2 and 3 will be referred to. It should be understood, however, that the control equipment corresponding to that shown in Figs. 2 and 3 and associated with the power plants for the other wheel trucks, including engines Nos. 2, 3, and 4 will be similarly and simultaneously operated.

Let it be assumed that the train of cars drawn by units A and B is stopped and that the various Diesel engines have been started and are driving the corresponding main generators Nos. 1, 2, 3, and 4 at idling speeds with the handle 12 of the throttle control switch in its Idle position. Let it be assumed further that the brake valve handle 58 is in its brake release position so that the brakes throughout the train are released.

In order to start the train the operator shifts the handle 12 of the throttle control switch TCS out of its Idle position in a clockwise position a desired amount to secure the desired acceleration and ultimate speed of the train. The contact 16 on the handle 12 thus bridges the arcuate contact segments 14 and 15 to establish the circuit previously traced for energizing the winding of the relay GFS which results in the actuation of the contacts of this relay to their picked-up positions.

In its picked-up position, the contact $a$ of the relay GFS establishes the circuit for energizing the field winding GF of main generator No. 1. This circuit extends from the positive battery wire 18 by way of a wire 81, a branch wire 82 including in series relation therein the contact $a$ of the relay GFS, the contact of the field shunting relay 28 and field winding GF to the wire 25 and thence to the negative battery wire 19. Field winding GF is accordingly energized to a maximum degree in view of the fact that the contact of the relay 28 shunts the resistor 27 out of the circuit.

Contact $b$ of relay GFS is effective when actuated to its picked-up or closed position to establish a circuit for energizing the winding of the relay GS and the winding of the relay S. This circuit extends from the positive battery wire 18 by way of the wire 81, a branch wire 83 including the contact $b$ of relay GFS, thence in parallel through two parallel branches, one branch including the winding of the relay GS and the other of which includes in series relation the back contact $c$ of relay P1 and the winding of the relay S, the two branches rejoining at the wire 25 which is connected to the negative battery wire 19.

The relay S is effective when picked-up, as previously described, to connect motor No. 1 and motor No. 2 in series across the bus wires 30 and 31 while the relay GS is effective when picked-up to connect the bus wires 31 and 30 to the terminals of the generator armature winding MG1.

Motor No. 1 and motor No. 2 are thus supplied with current from the generator No. 1 to drive the corresponding wheel units with a high starting torque.

Obviously, as the degree of displacement of the handle 12 of the throttle control switch TCS out of its Idle position is increased, the rate of supply of fuel to the Disel engine No. 1 as well as to the other engines Nos. 2, 3, and 4 is correspondingly increased so that engines drive the corresponding main generators Nos. 1, 2, 3, and 4, at correspondingly increased speed. Thus, depending upon the position of the handle of the throttle control switch TCS, the voltage impressed across the series connected motors No. 1 and No. 2 will vary so that the starting torque will correspondingly vary, as will the rate of acceleration of the train.

When the speed of the train increases above thirty-five miles per hour, the speed relay LS is picked-up in response to the voltage supplied by the speed governor generator No. 1. It will be understood that relay LS is conditioned so as not to be picked-up until the speed exceeds thirty-five miles per hour, due to the connection of the resistor LRA in series with the pick-up winding $a$ thereof under the control of contact $d$ of relay GFS.

Repeater relay LSR is correspondingly picked-up in response to the pick-up of the relay LS.

The contact $f$ of relay LSR is effective in its picked-up position to establish a circuit for energizing the winding of the relay P1. This circuit extends from the positive battery wire 18, by way of the wire 81, branch wire 83 including contact $b$ of relay GFS, a wire 85 including the contact $f$ of relay LSR, a wire 86, a wire 87, winding of relay P1 to a wire 88, and thence by wire 25 to the negative battery wire 19.

Upon the actuation of contact $c$ of relay P1 to its picked-up or open position, the circuit for energizing the winding of relay S is interrupted. The back contact $b$ of relay S is correspondingly restored to its dropped-out or closed position while contact $a$ of relay S is restored to its open position to interrupt the series connection of the motors. Upon the restoration of contact $b$ of relay S to its closed position, a circuit is established for energizing the windings of the relay P2. This circuit extends from the positive battery wire 18 to the wire 87 as previously traced for relay P1, thence by way of the front contact $b$ of the relay P1, contact $b$ of relay S, winding of relay P2, and wires 88 and 25 to the negative battery wire 19.

The contact $a$ of relay S is thus restored to its dropped-out or open position interrupting the series connection of motor No. 1 and motor No. 2 prior to the completion of the circuit for energizing the winding of the relay P2 in response to the drop-out of the contact $b$ of relay S.

With both of the relays P1 and P2 actuated to their picked-up positions the armature and field winding of motor No. 1 are connected in parallel with the armature and field winding of motor No. 2 across the bus wires 30 and 31 of generator No. 1 as previously described. The current supplied to motor No. 1 and motor No. 2 is thus correspondingly increased so that the motors further accelerate to drive the train at a higher speed.

If the handle 12 of the throttle control switch TCS is advanced sufficiently, the speed of the train will increase above eighty miles per hour. When the speed of the train exceeds eighty miles per hour, speed relay HS is picked-up in response to the voltage delivered by the speed governor generator No. 1. It will be understood that the relay HS is conditioned to respond only to a speed in excess of eighty miles per hour due to inclusion of the resistor HRA in series with the winding $a$ thereof by the contact $c$ of the relay GFS.

Repeater relay HSR is picked-up instantly in response to the pick-up of the speed relay HS.

Contact $f$ of relay HSR is effective in its picked-up or closed position to establish a circuit for energizing the windings of the contactors $fs1$ and $fs2$. This circuit extends from the positive battery wire 18 by way of the wire 81, branch wire 83 including contact $b$ of relay GFS, branch wire 85 including contact $f$ of relay LSR and contact $f$ of relay HSR in series relation therein, and thence through two parallel branches, one branch including the winding of the contactor $fs1$ and the other branch including the winding of the contactor $fs2$, the two branches rejoining at the wire 25 which is in turn connected to the negative battery wire 19.

The contactors $fs1$ and $fs2$ are thus effective to connect the corresponding field shunting resistors $fr$ in shunt relation to the field windings

*mf*1 and *mf*2 of motor No. 1 and motor No. 2 respectively, thereby effecting a further increase in the current through the armature windings M1 and M2 of the motors. This is the maximum speed condition of the motors and the speed at which the train is driven in excess of eighty miles per hour depends upon the ultimate degree of displacement of the handle 12 of the throttle control switch TCS out of its Idle position.

If, while the train is traveling at a speed in excess of eighty miles per hour, an ascending grade is encountered sufficient to cause a reduction in the speed of the train to below eighty miles per hour, the speed relay HS is dropped-out. Repeater relay HSR is thus also correspondingly dropped-out and the previously traced circuit, including the contact *f* of relay HSR, for energizing the windings of the contactors *fs*1 and *fs*2 is interrupted. The contactors *fs*1 and *fs*2 are thus dropped-out thereby disconnecting the shunting resistors *fr* from shunt relation with respect to the field windings *mf*1 and *mf*2 of motor No. 1 and motor No. 2. The motors are thus automatically restored to their parallel connection when the speed of the train reduces below eighty miles per hour during propulsion.

If the grade is sufficiently steep to cause a reduction in the speed of the train to below thirty-five miles per hour the relay LS and likewise the repeater relay LSR will be correspondingly dropped-out. Upon the drop-out of contact *f* of relay LSR, the previously traced circuit for energizing the windings of the relays P1 and P2 is interrupted and these relays are restored to their dropped-out positions.

Upon the restoration of contact *a* of relay P1 to its dropped-out or closed position, the circuit for energizing the winding of relay S is again completed and the contact *a* of the relay S is thus picked-up to effect the series connection of motor No. 1 and motor No. 2.

Thereafter, if the speed of the train again increases successively above thirty-five and eighty miles per hour, speed relays LS and HS are successively picked-up to cause the motors to be connected in parallel and with reduced field in succession in the manner previously described.

It will thus be seen that the connections of the motors and consequently the speed thereof is automatically controlled at all times in accordance with the speed of the train.

(b) Wheel-slip

In the above description of the operation, it was assumed that none of the driving wheels slip due to excessive propulsion torque exerted thereon. If, however, when the train is started, the traction of the driving wheels is so low or the rate at which the handle 12 of the throttle control switch TCS is advanced is so rapid, that either one or both of the driving wheels begin to slip, a further operation occurs which will now be described.

Let it be assumed that the leading wheel unit having wheel-slip generator No. 2 associated therewith begins to slip when the train is started. In such case, wheel-slip relay WS2 is picked-up in response to the abnormally high rate of acceleration of the slipping wheel. The circuit for energizing the winding *a* of speed relays LS and HS is thus interrupted due to the interruption of the circuit through the bus wire 41 in response to pick-up of contact *b* of relay WS2. It will thus be apparent that the repeater relays LSR and HSR are maintained in their dropped-out positions preventing the change of motor No. 1 and motor No. 2 from the series connection initially established.

At the same time, the indicating lamp 45 is illuminated and the field shunting relay 28 is picked-up in response to the actuation of contact *c* of relay WS2 to its picked-up or closed position. The excitation of the field winding GF of generator No. 1 is thus automatically and substantially reduced so as to reduce the voltage supplied by the generator. The current supplied to the series-connected motors No. 1 and No. 2 is thus correspondingly reduced so that the propulsion torque exerted on the driving wheels is correspondingly reduced. The reduction of the propulsion torque exerted by the motors on the driving wheels thus causes prompt cessation of the slipping condition and the immediate reduction in speed of the slipping wheels to the speed of travel of the train.

Whenever the rate of acceleration of the slipping wheels reduces sufficiently to cause drop-out of the relay WS2, the circuit for energizing the winding *a* of each of the speed relays LS and HS is automatically restored, the indicating lamp 45 is extinguished, and the shunting relay 28 is restored to its dropped-out position shunting resistor 27 in the circuit of the field winding GF.

It will be apparent that if the driving wheels with which the speed governor and wheel-slip generator No. 1 is associated begin to slip when the train is started, the same operation occurs as previously described except that the operation is initiated in response to pick-up of the relay WS1 instead of in response to the pick-up of the relay WS2.

(c) Braking

Let it now be assumed that while the train is traveling at a speed in excess of eighty miles per hour, the operator desires to apply the brakes to bring the train to a stop. To do so, the operator first restores the operating handle 12 of the throttle control switch TCS to its Idle position and then shifts the brake valve handle 58 out of its brake release position into the application zone thereof an amount corresponding to the desired degree of application of the brakes.

Upon the restoration of the throttle control switch TCS to its Idle position, the contact 16 on the handle disengages the arcuate contact segments 14 and 15, thereby interrupting the circuit for energizing the relay GFS and causing restoration of the contacts of the relay to their dropped-out positions.

The circuit for energizing the field winding GF of generator No. 1 is thus interrupted due to the drop-out of the contact *a* of the relay GFS. At the same time, the circuit for energizing the windings of relays GS and S is interrupted due to the drop-out of the contact *b* of the relay GFS. The bus wires 30 and 31 are thus disconnected from the terminals of the armature winding MG1 of the generator No. 1 due to the drop-out of the contacts of the relay GS. The series connection of the motors is interrupted due to the drop-out of the contact *a* of the relay S.

It will thus be apparent that unless the brakes are applied by operation of the brake valve BV, the restoration of the throttle control switch TCS to its Idle position will cause coasting of the train.

Upon displacement of the brake valve handle 58 into its application zone, the control pipe 52 is correspondingly charged with fluid under pressure.

The pressure operated switch PS is thus actuated to its closed position in response to the build-up of pressure in the control pipe 52 to above five pounds per square inch, but such operation is ineffective to cause energization of the winding $a$ of contactor BI because the contact $e$ of repeater relay HSR remains in its picked-up or open position due to the speed of the train exceeding thirty-five miles per hour.

It should be understood that when the relay GFS is restored to its dropped-out position, the speed relays LS and HS were rendered responsive to different speeds than during the propulsion period, due to the substitution of resistors LRB and HRB for resistors LRA and HRA respectively in response to the drop-out of contacts $c$ and $d$ of the relay GFS. Contact $e$ of relay HSR is thus picked-up because it is assumed that the train is traveling at a speed in excess of eighty miles per hour which of course exceeds the pick-up speed for relay HS of thirty-five miles per hour during the braking period.

The dynamic braking circuit for motor No. 1 and motor No. 2 is thus not established until the speed of the train reduces below thirty-five miles per hour as will be presently described.

In view of the fact that the dynamic braking circuit is not established, the magnet winding 65 of the suppression magnet valve SV remains deenergized and consequently the magnet valve SV establishes communication through which fluid under pressure may be supplied to the brake cylinders 57.

Fluid pressure is accordingly established in the brake cylinders 57 in accordance with the pressure of the fluid established in the control pipe 52 and the fluid pressure operated brakes are accordingly applied to the wheels in accordance with the pressure of the fluid established in the brake cylinders.

As long as the train exceeds a speed of thirty-five miles per hour, therefore, only the fluid pressure operated brakes are applied to brake the train.

When the speed of the train reduces below thirty-five miles per hour in response to the application of the fluid pressure operated brakes, the speed relay HS is automatically restored to its dropped-out position, correspondingly causing the drop-out of its associated repeater relay HSR.

Upon the restoration of contact $e$ of repeater relay HSR to its dropped-out or closed position, the previously traced circuit for energizing the winding $a$ of contactor BI is established and the contacts of contactor BI are correspondingly actuated to their picked-up position.

Since the train is still traveling in excess of twenty miles per hour, the speed relay LS is still picked-up, as is its associated repeated relay LSR. Accordingly, the contact $b$ of contactor BI is effective when actuated to its picked-up or closed position to establish the circuit, previously traced and including contact $g$ of relay LSR, for energizing the winding $a$ of contactor B2 so that the dynamic braking resistors R1 and R2 are correspondingly connected in parallel.

At the same time, the contact $c$ of contactor BI is effective when actuated to its picked-up or closed position to establish a circuit for energizing the winding of the relay P1. This circuit extends from the positive battery wire 18 by way of the wire 48 and branch wire 71, contact $c$ of contactor BI, wire 87, winding of relay P1, and wires 88 and 25 to the negative battery wire 19. The contact $c$ of relay P1 thus interrupts the circuit for the winding of relay S to insure the interruption of the series connection between the motors No. 1 and No. 2 prior to the parallel connection thereof for dynamic brake operation.

Relay P2 is picked-up in response to the actuation of contact $b$ of relay P1 to the picked-up or closed position, as previously described. Accordingly, it will be seen that motor No. 1 and motor No. 2 are connected in parallel for dynamic braking operation in response to the pick-up of the contactor BI.

With motors No. 1 and No. 2 connected in parallel, the actuation of contact $d$ of contactor BI to its picked-up or closed position establishes the dynamic breaking circuit through the wire 74, as previously indicated, including the parallel-connected dynamic braking resistors R1 and R2.

With the dynamic braking resistors R1 and R2 in parallel relation, a minimum resistance is provided and consequently the maximum dynamic braking current is permitted to flow in the circuit thereby producing the maximum degree of dynamic braking.

The reason for preventing the establishment of the dynamic braking circuit until the train speed reduces below thirty-five miles per hour is that the speed of the motors at train speeds in excess of thirty-five miles per hour is such as to produce an excessive dynamic braking current which might result in overheating of the field and armature windings of the motors. It is desirable, therefore, to prevent such overheating of the motor armature windings and field windings.

The magnet winding 65 of the suppression magnet valve SV is energized in response to the dynamic braking current initially established and consequently operates to interrupt the supply of fluid under pressure to the brake cylinders 57 and effects the exhaust of fluid under pressure therefrom through the port 66. As long as the dynamic braking current exceeds a certain degree corresponding to a certain low speed of the train, such as fifteen miles per hour, the suppression magnet valve SV is effective to continue to prevent the supply of fluid under pressure to the brake cylinders 57, and thereby maintain the fluid pressure operated brakes released.

When the speed of the train reduces below twenty miles per hour, the speed relay LS is restored to its dropped-out position, thereby restoring the associated repeater relay LSR to its dropped-out position.

It will be understood that the speed relay LS is conditioned to drop-out only when the speed of the train reduces below twenty miles per hour due to the substitution of the resistor LRB for the resistor LRA in response to the drop-out of the contact $d$ of relay GFS.

The contact $g$ of relay LSR is effective when restored to its dropped-out or open position to interrupt the circuit, previously traced, for energizing the winding $a$ of the contactor B2. Upon the consequent restoration of the contacts $b$ and $c$ of contactor B2 to their dropped-out positions, the dynamic braking resistors R1 and R2 are reconnected into series relation in the dynamic braking circuit, thereby effecting a substantial increase in the resistance of the dynamic braking circuit and a consequent reduction in the degree of the dynamic braking current. The degree of the dynamic braking effect exerted by motor No. 1 and motor No. 2 is thus substantially reduced when the speed of the train reduces below twenty miles per hour.

This feature whereby the dynamic braking effect exerted by motor No. 1 and motor No. 2 is reduced in response to the reduction in train speed below twenty miles per hour is of particular advantage when the train is traveling down a long descending grade because it enables the train to descend a long descending grade at a substantially uniform speed of travel. On a long descending grade, the reduction of the degree of dynamic braking effect due to decrease in speed below twenty miles per hour causes the speed to increase above twenty miles per hour at which time the dynamic braking effect is again increased. The speed of the train is thus automatically regulated to about twenty miles per hour without any application of the fluid pressure brakes.

When the speed of travel of the train reduces sufficiently, as for example below fifteen miles per hour, the suppression magnet valve SV is restored to its normal position reestablishing communication from the control pipe 52 to the brake cylinders 57. The fluid pressure brakes are accordingly reapplied automatically as the train approaches a stop, the degree of application corresponding to the degree of displacement of the brake valve handle 58 out of its brake release position. The operator will control the position of the brake valve handle at this time in such manner that the fluid pressure operated brakes will not excessively brake the wheels and cause sliding thereof.

It should be understood that the dynamic braking effect exerted by motor No. 1 and motor No. 2 decreases rapidly to zero once the speed of the train reduces below fifteen miles per hour. Thus, while the pressure is being built-up in the brake cylinders, the degree of dynamic braking effect is rapidly reducing. Thus, even though the fluid pressure brakes are applied simultaneously with the dynamic brakes there is little likelihood that an excessive degree of brake application will be effected so as to cause sliding of the wheels, unless the operator causes an excessive dgree of application of the fluid pressure brakes.

When the train comes to a stop, the fluid pressure operated brakes remain applied to a degree corresponding to the position of the brake valve handle 58. Therefore, when it is desired to again start the train, the operator must first shift the brake valve handle to its brake release position restoring the pressure in the control pipe 52 to atmospheric pressure and corrrepondingly releasing fluid under pressure from the brake cylinders 57 by way of the exhaust port and pipe 59 at the brake valve so as to effect the complete release of the brakes.

EMBODIMENT SHOWN IN FIGS. 4 AND 5

Figure 4:
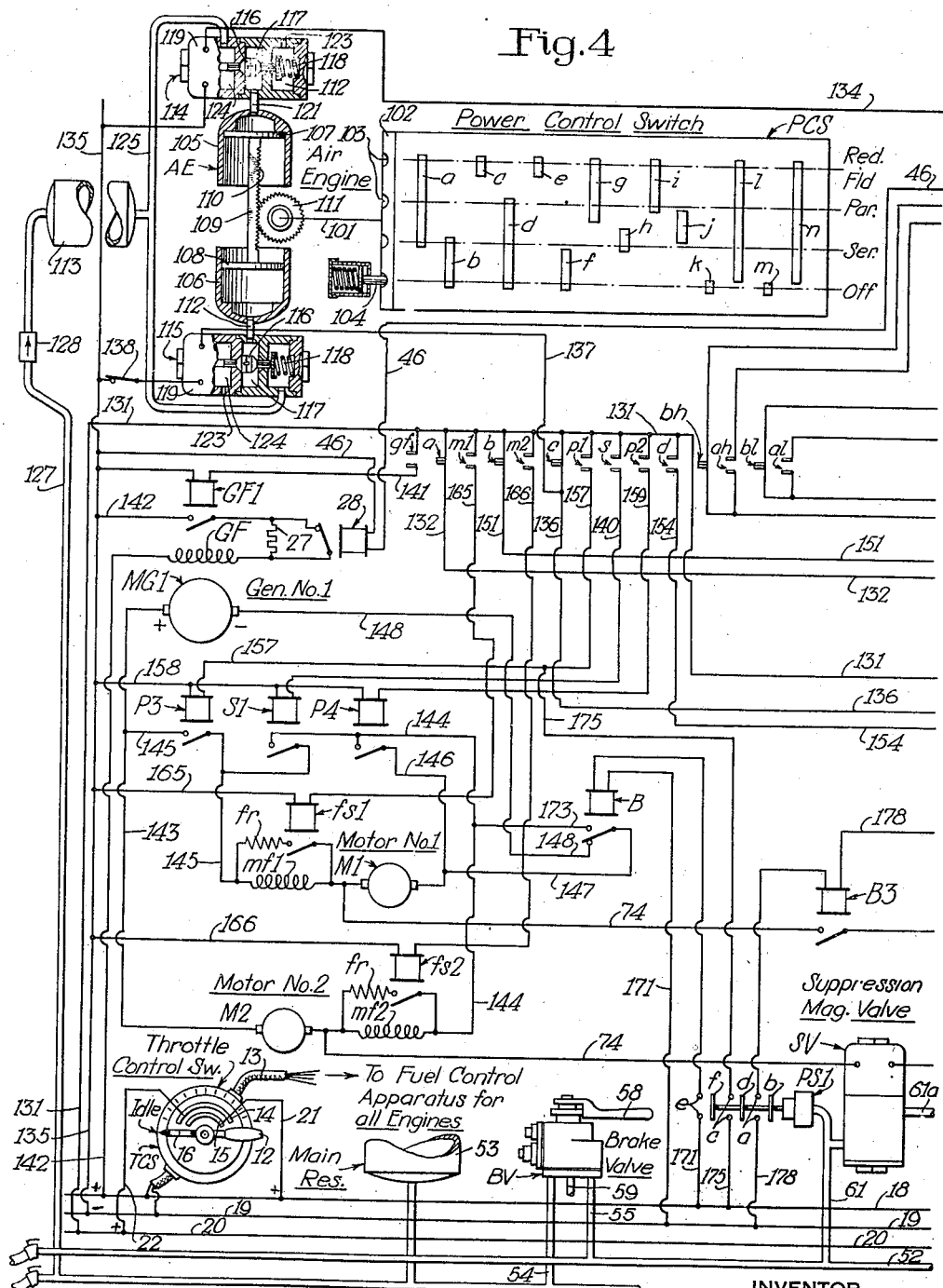
Figure 5:
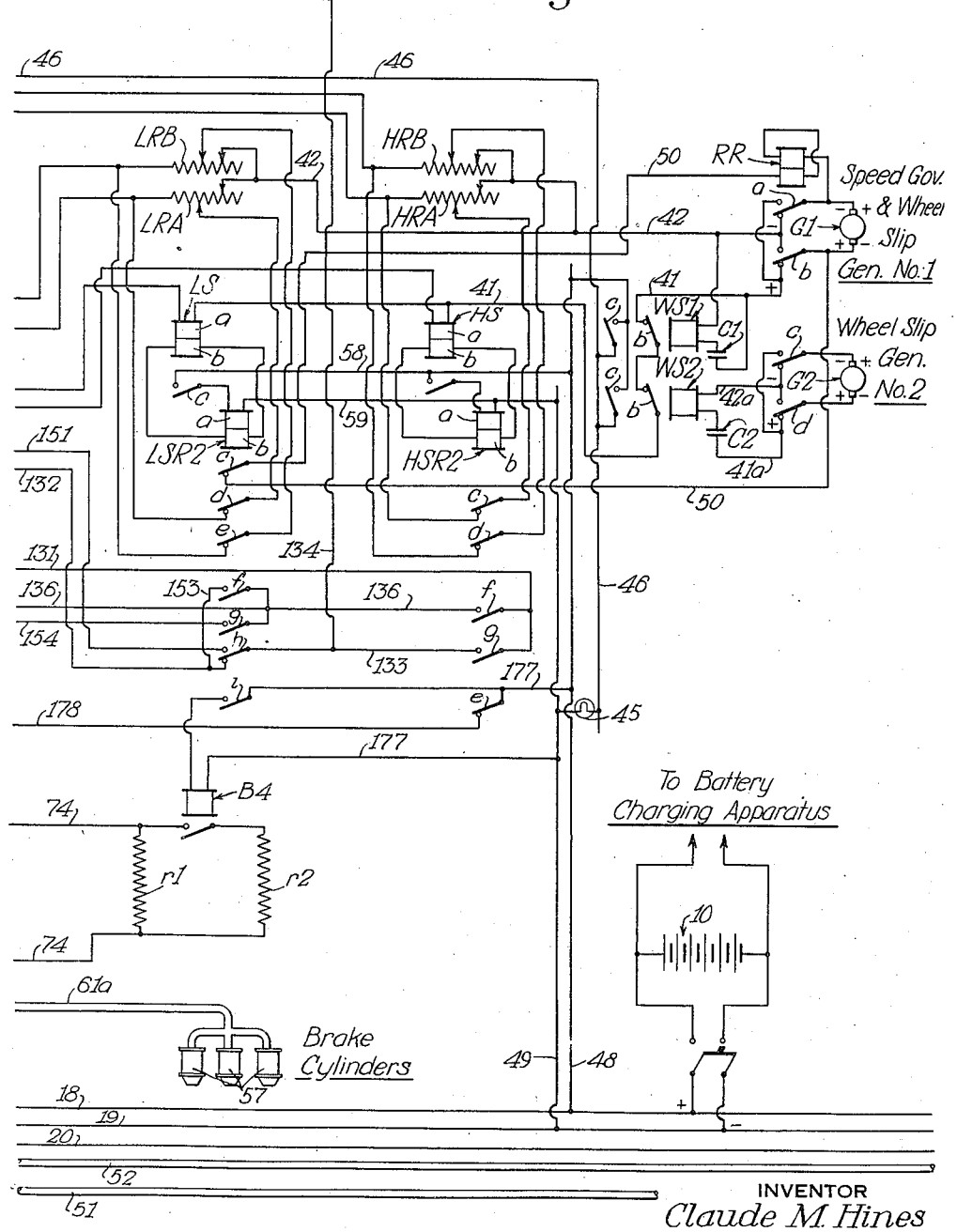

In Figs. 4 and 5 there is shown a modification of the equipment disclosed in Figs. 2 and 3. Certain parts and devices in the two equipments are identical and such elements are designated by the same reference numerals, previously employed, without further description. For simplicity, therefore, only those parts and operations different from the previous embodiment will be described.

Essentially, the equipment in Figs. 4 and 5 differs from that in the previous embodiment in that the control of relays P3, P4, and S1, respectively corresponding to relays P1, P2, and S, and the control of the contactors $fs1$ and $fs2$ for controlling the connections of motor No. 1 and motor No. 2 in the generator circuit is effected indirectly under the control of the repeater relays LSR2 and HSR2, corresponding respectively to repeater relays LSR and HSR through the medium of a power control switch PCS which is operated by an air engine AE.

The power control switch PCS performs the function of relay GFS in controlling the circuit of the generator field winding GF as well as the variation in the sensitivity of the speed relays LS and HS during propulsion and breaking respectively.

The control of motor No. 1 and motor No. 2 to establish the dynamic braking circuit is somewhat different from the previous embodiment, employing three contactors, B, B3, and B4 in place of the relay GS and contactors B1 and B2. Dynamic braking resistors $r1$ and $r2$ are provided in place of the dynamic braking resistors R1 and R2.

A pressure operated switch PS1 is provided in place of pressure switch PS and differs therefrom in having three contacts $b$, $d$ and $f$ adapted to engage associated pairs of stationary contacts $a$, $c$, and $e$ whenever and as long as the pressure in the control pipe 52 exceeds five pounds per square inch.

Considering the parts in somewhat greater detail the repeater relays LSR2 and HSR2 differ from the repeater relays LSR and HSR merely in the number of contacts operated thereby. Relay LSR2 has a transfer contact $h$ and a front contact $i$ in addition to contacts $c, d, e, f,$ and $g$ of relay LSR.

Repeater relay HSR2 differs from relay HSR in having a front contact $g$ in addition to contacts $c, d, e,$ and $f$ of the relay HSR.

As diagrammatically shown in developed form, the power control switch PCS comprises a number of cams $a, b, c, d, e, f, g, h, i, j, k, l, m,$ and $n$ fixed on a rotary operating shaft 101. The cams of the power control switch are adapted to be rotated in the manner presently to be described into any one of four operating positions designated respectively, "Off," "Series," "Parallel," and "Reduced Field." As diagrammatically shown, the shaft 101 may be provided with a disk 102 having notches 103 therein for receiving a spring biased pawl 103 which serves to yieldingly yet positively hold the cams in any of the various positions.

The cams $a$ to $n$ are adapted to operate corresponding contacts or switches to open or closed position, depending upon the rotary position of the cam. The switches operated by the cam are shown in vertical alignment directly beneath the corresponding cams and are designated $gf, a, m1, b, m2, c, p1, s, p2, d, bh, ah, b1,$ and $a1$.

It will be understood that, in accordance with conventional practice, the switch devices are operated to a closed position only in those operating positions covered by the cams in the development view and operated to open position in those operating positions not covered by the cams. Thus, with the cams rotated to the Off position, as shown, the switch $gf$, is in open position but is operated to closed position in the Series, Parallel and Reduced Field positions of the corresponding cam $a$.

Similarly, the switch $a$ is in closed position in the Off and Series positions of the corresponding cam b and in open position in the Parallel and Reduced Field positions of the cam.

The open and closed positions of the other switches of the power control switch PCS will be readily apparent from the drawings, when analyzed in a similar manner, without further description.

The air engine AE is effective to cause rotation of the shaft 101 to position the cams of the power controlled switch PCS in the various operating positions. As diagrammatically shown, the air engine AE comprises two air cylinders 105 and 106 respectively, in which pistons 107 and 108 respectively operate, the pistons being fixed at opposite ends of a connecting shaft or stem 109 having teeth thereon forming a gear rack 110. The gear rack 110 meshes with a pinion gear 111 fixed on the shaft 101.

Fluid under pressure is supplied to the cylinders 105 and 106 from a suitable reservoir 113 and released from the cylinders under the control of magnet valves 114 and 115 respectively. When fluid under pressure is supplied to both cylinders, the fluid pressure forces on the pistons are balanced and the shaft 101 is accordingly maintained stationary in the corresponding position. When the fluid pressure forces on the pistons are unbalanced, the shaft 101 is rotated in one direction or the other depending upon the direction of the unbalanced force.

The magnet valves 114 and 115 are substantially identical, each comprising a double beat valve 116 contained in a chamber 117 and normally biased to an upper seated position by a coil spring 118, a magnet winding or solenoid 119 being effective when energized to shift the valve 116 to its lower seated position.

The chambers 117 of the two magnet valves 114 and 115 are connected by short pipes 121 to the respective cylinders 105 and 106.

In its upper seated position the valve 116 of the magnet valve 114 connects the chamber 117 to a chamber 122 which is constantly open to atmosphere through an exhaust port 123. In its lower seated position, the valve 116 of magnet valve 114 closes communication between the chambers 117 and 122 and opens communication between the chamber 117 and a chamber 124 which is connected by a pipe 125 to the reservoir 113.

The reservoir 113 may be charged with fluid under pressure from the supply pipe 51 and the main reservoir 53 through a branch pipe 127 having a one-way or check valve 128 therein, for preventing back flow of fluid under pressure from the reservoir 113.

It will thus be apparent that when the magnet winding 119 of the magnet valve 114 is deenergized, fluid under pressure is exhausted to atmosphere from air cylinder 105 through the exhaust port 123. On the other hand, when the magnet winding 119 is energized, the exhaust communication is closed and fluid under pressure is supplied to the air cylinder 105.

The arrangement of the magnet valve 115 differs from that of the magnet valve 114 in that the chamber 118 does not have an exhaust port but is connected by the pipe 125 to the reservoir 113 while the chamber 124 is not connected to the pipe 125 but is provided with an exhaust port 123.

It will thus be seen that with the magnet winding 119 of the magnet valve 116 deenergized, fluid under pressure is supplied to the air cylinder 106. On the other hand, when the magnet winding 119 of the magnet valve 115 is energized, the supply communication is closed and communication is established through which fluid under pressure is released from the cylinder 106 through the exhaust port 123 in the chamber 124.

When fluid under pressure is supplied to the cylinder 106 and released from the cylinder 105, the shaft 101 of the power control switch PCS is rotated toward the "Off" position. Conversely when fluid under pressure is released from the air cylinder 106 and supplied to the cylinder 105 the shaft 101 is rotated toward the Reduced Field position thereof.

It will thus be apparent that with the magnet windings 119 of both magnet valves 114 and 115 deenergized, the shaft 101 of the power control switch PCS is rotated in the direction of the "Off" position and that with the magnet windings 119 of both magnet valves 114 and 115 energized, shaft 101 is rotated in the direction of the Reduced Field condition. It will also be apparent that in order to stop the shaft in series and parallel positions, it is necessary that the magnet winding 119 of the magnet valve 114 be energized while that of the magnet valve 115 is deenergized.

Since movement of the cam shaft 101 beyond either of the extreme positions, namely the "Off" position and Reduced Field position, is prevented by mechanical limiting means, not shown, both magnet valves 114 and 115 need not be energized to hold the shaft in these positions. Thus the magnet windings of both magnet valves 114 and 115 may be deenergized to maintain the shaft 101 in the "Off" position. Similarly, the magnet winding of the magnet valve 114 may be maintained energized while that of the magnet valve 115 is deenergized to maintain the shaft 101 in Reduced Field position.

The manner in which the magnet windings 119 of the magnet valves 114 and 115 are controlled so as to shift the power control switch PCS to any of its operating positions and hold it therein will be described in detail hereinafter in connection with an assumed operation. It may be mentioned however, at this point that the control of the magnet valves 114 and 115 is effected under the control of the repeater relays LSR2 and HSR2 in conjunction with interlock contacts or switches of the power control switch PCS.

OPERATION OF EQUIPMENT SHOWN IN FIGS. 4 AND 5

(a) *Propulsion*

Let it be assumed that the train of cars having the equipment shown in Figs. 4 and 5 is at a standstill with the throttle control switch TCS in its Idle position wherein Engine No. 1 is driving generator No. 1 at idling speed and with the brake valve handle 58 in brake release position so that the brakes on the train are released, and that the operator desires to start the train. To do so, he shifts the handle 12 of the throttle control switch TCS out of the Idle position in a clockwise direction to a desired degree corresponding to the desired degree of acceleration.

When the contact 16 on the handle 12 of the throttle control switch TCS bridges the contact segments 14 and 15, the circuit is completed for energizing magnet windings 119 of both magnet valves 114 and 115. This circuit may be traced from the positive battery wire 18 by way of wire 21, contact segment 15, contact 16, and contact segment 14 of the throttle control switch TCS, wire 22, throttle control wire 20, and thence to a bus wire 131 where the circuit divides into two branches, one branch extending by way of a wire 132 including the closed switch *a* of the power control switch PCS, back contact *h* of the repeater relay LSR2 in its dropped-out position, a wire 133, a wire 134 including the magnet winding 119 of magnet valve 114 to a wire 135 which is connected to the negative battery wire 19. The other branch extends from the bus wire 131 by way of a wire 136 including the closed contact *c* of the power control switch PCS, a branch wire 137 including the magnet winding 119 of the magnet valve 115 and a manually operated switch 138, the purpose of which will be hereinafter explained, to the wire 135 and thence to the negative battery wire 19.

Fluid under pressure is accordingly released from the air cylinder 106 and supplied to the air cylinder 105 and the shaft 101 of the power control switch PCS is thus rotated in the direction of the Reduced Field position.

The shaft 101 of the power control switch PCS is rotated until it reaches the Series position thereof in which the cam *f* effects opening of the interlock switch *c* thereby effecting deenergization of the magnet winding 119 of the magnet valve 115. Fluid under pressure is thus rapidly supplied to the cylinder 106 to balance the pressures on the pistons 107 and 108 and thereby promptly stop the shaft. In the event that the shaft is not accurately stopped in the Series position, the pawl 103 acts to so position the shaft and at the same time hold it firmly in such position.

In the Series position of the power control switch PCS, the cam *a* closes switch *gf*. The closure of the switch *gf* completes a circuit for energizing the magnet winding of a generator field contactor GF1, which circuit extends from the bus wire 131 by way of a wire 141 including the switch *gf* and the winding of the contactor GF1 to the wire 135 and thence to the negative battery wire 19. The contactor GF1 has a single front contact which is actuated to its closed position in response to energization of the winding of the contactor to complete a circuit for energizing the field winding GF of the main generator No. 1.

The circuit for energizing the generator field winding GF may be traced from the positive battery wire 18 by way of a wire 142 including field winding GF, the back contact of the field shunting contactor 28 now shunting the resistor 27, and the front contact of the contactor GF1 to the wire 135 and thence to the negative battery wire 19.

The generator No. 1 accordingly supplies a voltage corresponding to the speed at which it is driven by the corresponding Diesel engine.

In the Series position of the power control switch PCS, the switch *s* therefore is closed by the cam *h* to effect energization of the winding of the relay S1. This circuit for energizing the winding of relay S1 extends from bus wire 131 by way of a wire 140 including in series relation therein the switch *s* of power control switch PCS and the winding of relay S1 to a wire 158 and thence by wire 135 to the negative battery wire 19.

The single front contact of the relay S1 is effective when actuated to its picked-up or closed position in response to energization of the winding of the relay S1 to complete a circuit connecting motor No. 1 and motor No. 2 in series across the terminals of the generator No. 1. This circuit extends from the left-hand or positive terminal of the armature winding MG1 of the generator No. 1 by way of a bus wire 143, in series through armature winding M2 and field winding *mf2* of the motor No. 2, a wire 144 including the contact of relay S1 to a wire 145 thence in series through the field winding *mf1* and the armature winding M1 of motor No. 1 to a wire 146, and then by way of a wire 147 to the transfer contact of the contactor B in its dropped-out position, and a bus wire 148 to the negative terminal of the armature winding MG1.

The motors are thus supplied with current from generator No. 1 and accordingly drive the corresponding wheel units to effect acceleration of the train in accordance with the position of the handle 12 of the throttle control switch TCS. As in the previous embodiment, the voltage delivered by generator No. 1 varies in accordance with the speed of the driving Diesel engine which is, in turn, controlled according to the degree of displacement of the handle 12 of the throttle control switch out of its Idle position. The current supplied to the motors No. 1 and No. 2 is thus dependent upon the position of the throttle control switch and the rate of acceleration of the train therefore depending upon the position of the throttle control switch handle 12.

The train continues to accelerate in speed, with the throttle control switch handle 12 sufficiently advanced out of its Idle position, until the speed of thirty-five miles per hour is exceeded. At such time, the low speed relay LS is picked-up which causes the repeater relay LSR2 to be correspondingly picked-up. It should be understood that speed relay LS is conditioned to pick-up during propulsion at thirty-five miles per hour because of the inclusion of resistor LRA in series with its winding *a* across bus wires 41 and 42 by closure of switch *a1* of power control switch PCS.

The transfer contact *h* of relay LSR2 is effective when actuated to its picked-up position to interrupt the connection established through the switch *a* of the power control switch PCS for energizing the magnet winding 119 of the magnet valve 114 and substitutes therefor a connection between the bus wire 131 and 133 through a wire 151 including interlock switch *b* of the power control switch PCS. As will be apparent in Fig. 4, the interlock switch *b* of the power control switch PCS is closed in the Series position of the power control switch and is maintained closed until the power control switch shaft advances beyond the Parallel position in the direction of the Reduced Field position. Accordingly it will be seen that the circuit for energizing the magnet winding 119 of magnet valve 114 is maintained.

At the same time, the front contact *f* of relay LSR2 is effective in its picked-up position to establish a circuit for energizing the winding 119 of the magnet valve 115. This circuit may be traced from the positive battery wire 18 to the bus wire 131 as previously described, thence by way of wire 132 including the interlock switch *a*, a branch wire 153 including the contact *f* of relay LSR2 to the wire 136, and thence by way of the branch wire 137 including the winding 119 of magnet valve 115 and switch 138 to the wire 135 connected to negative battery wire 19.

Fluid under pressure is thus vented from cylinder 106 while being supplied to the cylinder 105. The shaft 101 is thus rotated by the air engine AE out of the Series position toward the Parallel position.

As the shaft 101 of the power control switch PCS is rotated out of Series position in the direction of the Parallel position, the control of the magnet winding 119 of magnet valve 115 is transferred from switch *a* of power control switch PCS to switch *d* of the power control switch, the switch *d* being closed by cam *j* prior to the opening of the switch *a*. When switch *d* closes, it establishes a connection through a wire 154 from the bus wire 131 to the front contact *g* of relay LSR2 which connects the wire 154 to the wire 136. The magnet winding 119 of magnet valve 115 is thus maintained energized as the shaft 101 of the power control switch PCS continues to rotate toward the Parallel position notwithstanding the opening of switch *a* of the power control switch.

When the shaft 101 of the power control switch PCS reaches the Parallel position, the switch *d* is opened and deenergization of the magnet winding 119 of magnet valve 115 correspondingly effected. Fluid under pressure is thus again supplied to the cylinder 106 while continuing the supply to the cylinder 105, so that the fluid pressure forces on the pistons of the air engine AE are balanced, thus causing the shaft 101 of the power control switch to be stopped in the Parallel position thereof.

With the power control switch PCS in its Parallel position, switches *p1* and *p2* are closed by the corresponding cams *g* and *i*. Switch *p1* is effective when closed to complete a circuit for energizing the winding of relay P3. This circuit may be traced from the positive battery wire 18 to the bus wire 131 as previously described, thence by way of a wire 157 including switch *p1* and the winding of the relay P3 in series to wire 158, then by way of the wire 135 to the negative battery wire 119.

The switch *p2* of the power control switch is effective when closed to complete a circuit for energizing the winding of the relay P4. This circuit may be traced from the positive battery wire 18 to the bus wire 131 as previously described, thence through a wire 159 including the switch P2 and the winding of the relay P4 in series to the wire 158, then by the wire 135 to the negative battery wire 19.

During the traverse of the power control switch PCS from its Series to its Parallel position the switch *s* is operated to its open position to effect deenergization of the winding of the relay S1 prior to the energization of either of the relays P3 and P4. Thus the series connection of motor No. 1 and motor No. 2 is interrupted prior to the pick-up of the two relays P3 and P4 which are effective to connect the motors in parallel across the terminals of the generator No. 1.

With the relays P3 and P4 picked-up and the relay S1 restored to its dropped-out position, the circuit for connecting motor No. 1 and motor No. 2 in parallel may be traced from the positive terminal of the armature winding MG1 of generator No. 1 through the bus wire 143, thence through two parallel branches one of which extends in series through the armature winding M2 and field winding *mf2* of motor No. 2, wire 144, the front contact of the relay P4 to wire 146, and the other branch extending from the bus wire 143 through wire 145 including the front contact of the relay P3, and thence in series through the field winding *mf1* and armature winding M1 of motor No. 1 to the wire 146, the circuit then continuing by way of the wire 147, the transfer contact of the contactor B in its dropped-out position and bus wire 148 to the negative terminal of the generator armature winding MG1.

With the motor No. 1 and motor No. 2 thus connected in parallel, the current supplied to the field and the armature windings thereof is correspondingly increased and the motors thus further accelerate the speed of the train.

Assuming that the handle 12 of the throttle control switch TCS is sufficiently advanced, the motors while connected in parallel will continue to accelerate the speed of the train until it exceeds a speed of eighty miles per hour, at which time the speed relay HS is picked-up in response to the voltage impressed on the bus wires 41 and 42 of the speed governor generator No. 1.

It will be observed that the switch *ah* of the power control switch PCS is closed in all positions of the power control switch except "Off" position so that the resistor HRA is therefore included in series with the winding *a* of the relay HS across the bus wires 41 and 42, thus causing the relay HS to be picked-up only when the speed of the train exceeds eighty miles per hour in the same manner as in the embodiment shown in Figures 2 and 3.

Repeater relay HSR2 is simultaneously picked-up in response to the pick-up of the speed relay HS. The front contact *g* of relay HSR2 is effective in its picked-up or closed position to establish a circuit for maintaining the magnet winding 119 of the magnet valve 114 energized, this circuit extending from the positive battery wire 18, to the bus wire 131 as previously described, thence by way of the contact *g* of relay HSR2, wires 133 and 134, magnet winding 119 of magnet valve 114 and wire 135 to the negative battery wire 19.

At the same time, front contact *f* of relay HSR2 is effective in its picked-up or closed position to establish a circuit for energizing the magnet winding 119 of the magnet valve 115. This circuit may be traced from the positive battery wire 18 to the bus wire 131 as previously described, thence by way of the contact *f* of relay HSR2, wire 136, wire 137 including the magnet winding 119 of magnet valve 115 and the manual switch 138 to the wire 135, and thence to the negative battery wire 19.

Fluid under pressure is thus vented from the cylinder 106 while being supplied to the cylinder 105. Shaft 101 of the power control switch PCS is consequently rotated out of the Parallel position toward the Reduced Field position.

Movement of the shaft 101 continues until the Reduced Field position is attained when further movement of the shaft is prevented by the mechanical stop device previously mentioned. Thus it is not necessary to balance the fluid pressure forces on the pistons of the air engine AE to maintain the power control switch PCS in its Reduced Field position.

With the power control switch PCS in its Reduced Field position, switches *m1* and *m2* are both actuated to closed position by their corresponding cams *c* and *e*. The switch *m1* is effective when closed to complete a circuit for energizing the winding of the field shunting contactor *fs1*. This circuit may be traced from the positive battery wire 18 to the bus wire 131 as previously described, thence by way of a wire 165 including switch *m1* and the winding of the contactor *fs1* in series to the wire 135 and thence to the negative battery wire 19.

In a similar manner switch *m2* of the power control switch PCS is effective when closed to complete a circuit for energizing the winding of the field shunting contactor *fs2*. This circuit may be traced from the bus wire 131 through a wire 166 including switch m2 and the winding of the contactor fs2 in series to the wire 135 and thence to the negative battery wire 19.

With the power control switch PCS in its Reduced Field position, therefore, the field shunting contactors fs1 and fs2 are simultaneously picked-up to connect the shunting resistors fr across the corresponding motor field windings mf1 and mf2 to effect a corresponding increase in the current through the armature windings M1 and M2 of the motors.

As long as the speed of the train exceeds eighty miles per hour the power control switch PCS continues to remain in its Reduced Field position. The ultimate speed of the train above eighty miles per hour will vary depending upon the degree of displacement of the handle 12 of the throttle control switch TCS out of its Idle position. Thus the speed of the train may be increased to above one hundred miles per hour in the Reduced Field position of the power control switch PCS.

If, during the propulsion of the train, an ascending grade is encountered which causes the train speed to decrease to below eighty miles per hour, the speed relay HS is dropped-out, causing the repeater relay HSR2 to also be dropped-out.

The circuits, previously traced, for energizing the magnet windings 119 of magnet valves 114 and 115 of the air engine AE and including contacts f and g of repeater relay HSR2 are thus interrupted due to the drop-out of the contacts f and g of relay HSR 2. With the magnet windings 119 of the magnet valves 114 and 115 both simultaneously deenergized, fluid is vented from the cylinder 105 and supplied to the cylinder 106, thus causing the shaft 101 of the power control switch PCS to be rotated from the Reduced Field position toward the Parallel position.

When the power control switch shaft 101 reaches its Parallel position, a circuit is established for energizing the magnet winding 119 of magnet valve 114 to balance the pressures on the pistons of the air engine AE and thereby stop the power control switch in its Parallel position.

This circuit extends from the positive battery wire to the bus wire 131 as previously described, thence by way of switch b of the power control switch PCS which is closed in the Parallel position thereof, wire 151, transfer contact h of the repeater relay LSR2 in its picked-up position, wires 133 and 134, magnet winding 119 of magnet valve 114, to the wire 135 and thence to the negative battery wire 19.

The power control switch PCS then remains in its Parallel position unless the speed of the train again increases above eighty miles per hour, in which case it is restored to the Reduced Field position, or unless the speed of the train reduces to below thirty-five miles per hour. In the latter case, the speed relay LS is correspondingly dropped-out to cause drop-out of the repeater relay LSR2. Transfer contact h of relay LSR2 is effective when restored to its dropped-out position to interrupt the circuit through switch b of the power control switch PCS maintaining the magnet winding 119 of the magnet valve 114 energized and the magnet winding is thus deenergized to effect venting of fluid under pressure from the cylinder 105. With the supply of fluid under pressure to the cylinder 106 continued due to the deenergization of the magnet winding 119 of the magnet valve 115 at this time, the shaft 101 of the power control switch PCS is correspondingly rotated out of the Parallel position toward the Series position.

When the shaft 101 of the power control switch PCS reaches Series position, a circuit is reestablished for energizing the magnet winding 119 of magnet valve 114 in response to the closure of the switch a of the power control switch PCS. This circuit extends from the bus wire 131 by way of the wire 132 including switch a of the power control switch, transfer contact h of the repeater LSR2, wires 133 and 134, magnet winding 119 of magnet valve 114, and wire 135 to negative battery wire 119.

The fluid pressure forces on the pistons of the air engine are thus again balanced and the shaft 101 of the power control switch is stopped in the Series position.

It will be understood that the connections of motor No. 1 and motor No. 2 are correspondingly changed in accordance with the change in the position of the power control switch PCS in the manner previously described.

It will thus be apparent that during the propulsion of the train, the connections and therefore the speed of motor No. 1 and motor No. 2 will be automatically controlled in accordance with the speed of the train. The operator may of course vary the speed of the train at any time by varying the degree of displacement of the handle 12 of the throttle control switch out of the Idle position.

The manual switch 138 is provided for the purpose of preventing frequent shifting of the power control switch PCS, such as might possibly occur in rolling country having alternate ascending and descending grades. Thus, if the train is traveling at seventy or seventy-five miles per hour and starts to travel on a descending grade, the speed of the train may increase to above eighty miles per hour, thereby causing the power control switch PCS to be shifted to the Reduced Field position from the Parallel position and then back to the Parallel position when the train traverses the subsequent ascending grade.

If, therefore, the operator desires to prevent the advance of the power control switch PCS beyond a particular position, such as the Parallel position, he may open the switch 138 to cause the magnet winding 119 of the magnet valve 115 to remain deenergized independently of the operation of either of the repeater relays LSR2 and HSR2 in response to variations in the speed of the train.

If the operator opens the manual switch 138, the pickup of the repeater relay HSR2 in response to the increase in the speed of the train above eighty miles per hour will not be effective to cause energization of the magnet winding of the magnet valve 115. Thus, notwithstanding the increase in the speed of the train above eighty miles per hour, the air engine AE is prevented from operating the power control switch PCS out of Parallel position to the Reduced Field position.

It is thus possible to maintain a more nearly uniform speed in rolling country without the necessity of constantly operating the throttle control switch TCS to control the train speed.

(b) Wheel-slip

In the event that either one or both of the wheel units driven by motor No. 1 and No. 2 begin to slip during the propulsion of the train due to excessive propulsion torque, the wheel slip relays WS1 and WS2 are correspondingly picked-up as in the first described embodiment, to cause the drop-out of either one or both of the speed relays LS and HS if the speed of the train attained is sufficient to cause these relays to have been picked-up or, if the speed of the train has not exceeded thirty-five miles per hour, to prevent the pick-up of either of the relays LS and HS.

If the power control switch PCS is in its Series position at the time slipping of the wheels occurs, the interruption of the circuit for energizing the speed relays LS and HS prevents pick-up of these relays and thereby prevents advance of the power control switch PCS out of Series position toward the Parallel position in response to the momentary increase in speed of the wheel unit with which governor generator No. 1 is associated during slipping.

If the power control switch PCS is in either the Parallel or the Reduced Field position thereof when slipping of the wheels occurs, the drop-out of either of the speed relays LS and HS will automatically effect the operation of the air engine AE in the manner readily apparent from previous description to cause the return of the power control switch PCS to the Series position, until slipping ceases whereupon the power control switch will be restored to the position corresponding to the speed of the train.

The pick-up of either one or both of the wheel-slip relays WS1 or WS2 is likewise effective in the same manner as in the first described embodiment to cause completion of the circuit for the indicating lamp 45 and the field shunting relay 28 due to the pick-up of the contacts $c$ thereof. The field shunting contactor 28 is effective to remove the shunt connection around the resistor 27 in the generator field winding circuit thereby inserting the resistor 27 and effecting a substantial reduction in the excitation of the generator No. 1. As in the first described embodiment, the voltage delivered by the generator No. 1 is thus reduced, causing a consequent reduction in the current supplied to the motors No. 1 and No. 2 which results in a prompt restoration of the slipping wheels to a speed corresponding to the speed of travel of the train.

As in the first embodiment, the operator may return the handle 12 of the throttle control switch TCS back toward the Idle position thereof upon observing the illumination of the indicating lamp 45, thereby also effecting a further reduction in the voltage delivered by the generator with a consequent reduction in the current supplied to the motor No. 1 and motor No. 2 to eliminate the slipping condition of the wheels.

(c) Braking

Let it now be assumed that while the train is traveling at a speed in excess of eighty miles per hour, the operator desires to bring the train to a stop. To do so, he first restores the handle of the throttle control switch TCS to its Idle position, thereby disengaging the contact 16 from the contact segments 14 and 15 and interrupting the connection between the positive battery wire 18 and bus wire 131. Since energization of the magnet windings of the magnet valves 114 and 115 depends upon energization of the bus wire 131, it will be understood that the deenergization of the bus wire 131 effects instantaneous deenergization of the magnet windings of both magnet valves 114 and 115. The air engine AE accordingly promptly and rapidly restores the power control switch PCS from the Reduced Field position to the Off position.

In the Off position of the power control switch PCS, switch $gf$ thereof is restored to open position causing drop-out of the field contactor GF1 and the consequent deenergization of the field winding GF of generator No. 1. At the same time, the relays P3 and P4 of the relay S1 are all dropped-out, thereby disconnecting motor No. 1 and motor No. 2 from the generator circuit.

With the power control switch PCS in its Off position, the switches $ah$ and $al$ are opened and the switches $bh$ and $bl$ are closed. With the switch $bl$ closed, resistor LRB is connected in series with the winding $a$ of the speed relay LS across the bus wires 41 and 42, thereby conditioning the speed relay LS so as to be picked-up in response to train speeds in excess of twenty miles per hour.

At the same time, switch $bh$ of the power control switch PCS is effective in its closed position to connect resistor HRB in series with the winding $a$ of relay HS thereby conditioning the relay HS so as to be picked-up at train speeds in excess of thirty-five miles per hour.

After the operator restores the throttle control switch handle to its Idle position, he operates the brake valve handle 58 out of its brake release position into the application zone to a position corresponding to the degree of application desired.

The control pipe 52 is accordingly charged to a corresponding pressure and as the pressure builds-up in excess of five pounds per square inch in the control pipe, the contacts of the pressure switch PS1 are actuated into engagement with the associated stationary contacts, that is they are actuated to their respective closed positions.

The contact $f$ of pressure switch PS1 is effective in its closed position to establish a circuit for energizing the winding of the contactor B. This circuit extends from the positive battery wire 18 through a wire 171 including the contact $f$ of pressure switch PS1 and the winding of the contactor B in series, to the negative battery wire 19.

The transfer contact of contactor B is effective when actuated to its picked-up position to interrupt the connection between the wire 147 and the bus wire 148, thereby preventing the connection of the motors across the terminals of the generator's armature winding MG1. At the same time, the transfer contact of the contactor B is effective in its picked-up position to connect a branch wire 173 of wire 144 to the wire 147, thereby connecting the right-hand terminal of the armature winding M1 of motor No. 1 to the right-hand terminal of the field winding $mf2$ of motor No. 2.

In its closed position, the contact $d$ of pressure switch PS1 is effective to establish a circuit for energizing the winding of the relay P3. This circuit extends from the positive battery wire 18 by way of a wire 175, including the contact $d$ of pressure switch PCS, wire 157 including the winding of the relay P3, wire 158, and thence by wire 135 to the negative battery wire 19.

The contact of relay P3 is effective in its picked-up or closed position to connect the left-hand terminal of the armature winding M2 of motor No. 2 to the left-hand terminal of the field winding $mf1$ of motor No. 1.

The contactor B and the relay P3 accordingly function to connect motor No. 1 and motor No. 2 in parallel relation for dynamic braking operation thereof. The dynamic braking circuit associated with motor No. 1 and motor No. 2 is not established however unless contactor B3 is picked-up. With the train traveling in excess of thirty-five miles per hour, however, the winding of the contactor B3 remains deenergized because the contact e of relay HSR2 controlling the energization thereof is not restored to its dropped-out or closed position until the speed of the train reduces below thirty-five miles per hour.

In view of the fact that the dynamic braking circuit is not established, as just pointed out, until the speed of the train reduces below thirty-five miles per hour, the magnet winding of the suppression magnet valve SV remains deenergized during the time that the train reduces from a speed in excess of eighty miles per hour to a speed below thirty-five miles per hour.

Accordingly the suppression magnet valve SV is conditioned during such time to establish communication between the control pipe 52 and the brake cylinders 57 so that the brake cylinders are thus charged with fluid at a pressure corresponding to that established in the control pipe 52 to effect a corresponding degree of application of the fluid pressure brakes associated with the corresponding wheels of a train.

It will thus be apparent that the speed of the train is reduced due solely to application of the fluid pressure brakes as long as the speed of the train exceeds thirty-five miles per hour. When the speed of the train reduces below thirty-five miles per hour, however, the speed relay HS drops-out automatically in response to the reducing voltage supplied by the speed governor generator No. 1 and the repeater relay HSR2 is thus also correspondingly dropped-out.

Upon the restoration of the contact e of the repeater relay HSR2 to its dropped-out or closed position, the circuit is established for energizing the winding of the contactor B3. This circuit extends from the positive battery wire 18 by way of the branch wire 48, a wire 177, and a wire 178 including the contact e of relay HSR2, winding of the contactor B3 and contact b of pressure switch PS1 in series relation therein, to the negative battery wire 19.

The contact of the contactor B3 is effective in its picked-up or closed position to establish the dynamic braking circuit similar to that previously described in the first embodiment and extending through a circuit wire 74 from one terminal of the armature winding M1 of motor No. 1 to the corresponding terminal of the armature winding M2 of motor No. 2.

The dynamic braking circuit includes either the dynamic braking resistor r1 alone or the dynamic braking resistors r1 and r2 in parallel relation, depending upon whether the contactor B4 is dropped-out or picked-up respectively.

The winding of the contactor B4 is energized as long as the front contact i of repeater relay LSR2 is picked-up. This circuit may be traced from the positive battery wire 18 by way of the branch wire 48, wire 177 including in series relation therein the contact i of relay LSR2 and the winding of the contactor B4, to the branch wire 49, which is connected to the negative battery wire 19.

Assuming, therefore, that the train has just reduced in speed to below thirty-five miles per hour, the repeater relay LSR2 is still picked-up because the speed relay LS controlling it is still picked-up. Thus, at this time, the winding of the contactor B4 is energized and its single front contact is actuated to its picked-up or closed position to connect the braking resistor r2 in parallel relation to the resistor r1.

With the resistors r1 and r2 in parallel relation in the dynamic braking circuit, the minimum resistance is provided and consequently the maximum dynamic braking current is established.

The magnet winding of the suppression valve SV is energized in response to the dynamic braking current exceeding a certain degree in the same manner as in the first described embodiment. Thus the suppression magnet valve SV is operated when the speed of the train reduces below thirty-five miles per hour to interrupt the supply of fluid under pressure to the brake cylinders 57 and exhaust fluid under pressure therefrom. The fluid pressure operated brakes associated with the wheels are thus released when the dynamic brake application is initiated. Thus simultaneous continued application of the dynamic brakes and of the fluid pressure operated brakes which might cause sliding of the wheels, is prevented.

The train thereafter continues to reduce in speed due solely to application of the dynamic brakes until such time as the speed reduces to below twenty miles per hour. At such time, the relay LS is dropped-out in response to the reducing voltage supplied to the speed governor generator No. 1 and the repeater relay LSR2 is thus also correspondingly dropped-out.

Upon the restoration of the contact i of repeater relay LSR2 to its dropped-out or open position, the circuit previously described for energizing the winding of the contactor B4 is interrupted and the front contact of the contactor is thus restored to its dropped-out or open position disconnecting the resistor r2 from the dynamic braking circuit.

The resistance of the dynamic braking circuit is accordingly increased and the dynamic braking current correspondingly reduced to effect a corresponding reduction in the degree of application of the dynamic brakes.

This operation is the same as in the first embodiment and the reason therefor is the same; namely it enables regulating of the speed of the train to about twenty miles per hour on a long descending grade.

When the speed of the train reduces further due to the application of the dynamic brakes to below a certain speed, such as fifteen miles per hour, the current energizing the winding of suppression magnet valve SV is insufficient to maintain the suppression valve in its suppressing position and it is accordingly restored to the position establishing communication between the brake cylinders and the control pipe so that fluid under pressure is again supplied to the brake cylinders 57 to effect reapplication of the fluid pressure brakes.

As previously pointed out, when the speed of the train reduces below fifteen miles per hour, the braking effect produced by the dynamic brakes falls rapidly and thus the reapplication of the fluid pressure brake is not effective to cause a sufficient degree of application to cause sliding of the wheels ordinarily. The operator may readily control the degree of application of the fluid pressure brakes by means of the brake valve BV so that an excessive degree of brake application does not occur at this time.

The train is accordingly brought to a complete stop with the fluid pressure operated brakes remaining applied in accordance with the position of the brake valve handle 58.

When the operator again desires to start the train, he first effects release of the brakes by restoring the brake valve handle 58 to its brake release position thereby reducing the pressure in the control pipe 52 and the connected brake cylinders 57 to atmosphere through the exhaust port and pipe at the brake valve.

SUMMARY

Summarizing, it will be seen that I have disclosed two embodiments of brake and propulsion control systems for vehicles, particularly railway cars and trains having one or more power or traction units of the Diesel-electric type. Both systems are similar in that they provide a speed governor of the electric type associated with a wheel unit and registering the rotational speed thereof for controlling the connection of a plurality of driving motors associated with different wheel units whereby to control the speed of the motors in accordance with the speed of travel of the car or train.

In one system, the connections of the motors are controlled directly by relays conditioned in accordance with the voltage delivered by an axle-driven generator comprising the electric speed governor. The other system differs from the first in providing a power control switch operated by an air engine which is in turn controlled by the speed controlled relays, the power control switch operating to vary the connections of the propulsion motors.

Both systems include brake control equipment for fluid pressure operated brakes and for connecting the propulsion motors to act as dynamic brakes.

In both systems the speed controlled relays which control the connections of the propulsion motors during propulsion serve also to control and coordinate the application of the fluid pressure and the dynamic brakes during braking. Both systems provide means for causing the speed controlled relays to respond to different speeds registered by the electric governor depending upon whether propulsion or braking is in effect. Both systems are so arranged as to prevent the application of the dynamic brakes at speeds in excess of a certain speed, such as thirty-five miles per hour, so that only the fluid pressure operated brakes are effective above such speed. In both systems, the fluid pressure operated brakes are released and the dynamic brakes applied over a speed range extending from thirty-five miles per hour to a certain lower speed, such as fifteen miles per hour. Below fifteen miles per hour the fluid pressure operated brakes are reapplied. In both systems the degree of braking effectiveness of the dynamic brakes is automatically reduced under the control of speed governor means when the train speed reduces below twenty miles per hour. This enables regulation of train speed substantially to twenty miles per hour on long descending grades.

In both systems, electrical means is provided registering the slipping condition of wheel units driven by the propulsion motors and caused by excessive propulsion torque, the electrical means being operative to prevent a change in the connections of the motors tending to increase the speed thereof during the slipping of the wheels and at the same time effective to reduce the excitation of the Diesel-driven generators supplying power to the propulsion motors to cause a prompt return of the motors driving the slipping wheels, to vehicle speed.

In the system having a power control switch operated by an air engine, means under the control of the operator is provided for optionally preventing frequent changing of the connections of the motors by the power control switch at certain times, such as when the train is traveling in rolling country.

Having now described my invention what I claim as new and desire to secure by Letters Patent, is:

1. In a brake control apparatus for a vehicle having dynamic brake means and fluid pressure operated brake means, means under the control of the operator for simultaneously initiating application of the dynamic brake means and of the fluid pressure operated brake means, governor means responsive to the rotational speed of a wheel unit of the vehicle for preventing application of the dynamic brake means until the vehicle reduces below a certain speed, and means controlled by said governor means for effecting a reduction in the braking effect exerted by the dynamic braking means when the vehicle reduces below a second certain speed lower than the first certain speed.

2. In a brake control apparatus for a vehicle having dynamic brake means and fluid pressure operated brake means, means under the control of the operator for simultaneously initiating application of the dynamic brake means and of the fluid pressure operated brake means, governor means responsive to the rotational speed of a wheel unit of the vehicle for preventing application of the dynamic brake means, notwithstanding operation of the operator controlled means to cause simultaneous application of the fluid pressure operated brake means and the dynamic brake means, until the vehicle reduces below a certain speed, and means responsive to the degree of dynamic braking effect and operative, notwithstanding operation of the operator controlled means to cause simultaneous application of the dynamic brake means and the fluid pressure operated brake means, to effect release of the fluid pressure operated brake means as long as the dynamic brake means exerts a braking effect in excess of a certain degree.

3. In a brake control apparatus for a vehicle having dynamic brake means and fluid pressure operated brake means, the combination of means under the control of the operator for simultaneously initiating application of the dynamic brake means and of the fluid pressure operated brake means, means for supplying a voltage substantially proportional to the rotational speed of a wheel unit of the vehicle, and means responsive to the voltage delivered by the voltage supply means and effective as long as said voltage exceeds a certain value for preventing application of the dynamic brake means, said voltage responsive means being effective to cause application of the dynamic brake means to one certain degree when the voltage delivered by the voltage supply means decreases below said certain value but exceeds a second certain value lower than said certain value and operative to effect a reduction in the degree of application effected by the dynamic brake means when the voltage delivered by the voltage supply means reduces below said second certain value.

4. In a brake control apparatus for a vehicle having dynamic brake means and fluid pressure operated brake means, the combination of means under the control of the operator for simultaneously initiating application of the dynamic brake means and of the fluid pressure operated brake means, means for supplying a voltage substantially proportional to the rotational speed of a wheel unit of the vehicle, means responsive to the voltage delivered by the voltage supply means and effective as long as said voltage exceeds a certain value for preventing application of the dynamic brake means, notwithstanding operation of the operator controlled means to cause application of the dynamic brake means, and means effective to cause release of the fluid pressure operated brake means as long as the dynamic brake means exceeds a certain degree of effectiveness, notwithstanding operation of the operator controlled means to cause application of the fluid pressure operated brake means.

5. In a brake control apparatus for a vehicle having at least two propulsion motors adapted to act as dynamic brakes and having also fluid pressure operated brake means, the combination of manually operated means for effecting application of the fluid pressure operated brake means, a governor device responsive to the rotational speed of a wheel unit of the vehicle, and means under the joint control of said governor device and said manually operated means for causing said propulsion motors to be effective as dynamic brakes only when the speed of the vehicle reduces below a certain value while said manually operated means is operated to cause application of the fluid pressure operated brake means.

6. In a brake control apparatus for a vehicle having dynamic brake means and fluid pressure operated brake means, the combination of means under the control of the operator for simultaneously initiating application of the dynamic brake means and of the fluid pressure operated brake means, a governor device responsive to the speed of the vehicle, and means controlled by the governor device for preventing application of the dynamic brake means as long as the vehicle exceeds a certain speed and effective during a brake application initiated by the operator controlled means to effect application of the dynamic brake means and the release of the fluid pressure operated brake means when the vehicle reduces below said certain speed.

7. In a brake control apparatus for a vehicle having dynamic brake means and fluid pressure operated brake means, the combination of means under the control of the operator for simultaneously initiating application of the dynamic brake means and of the fluid pressure operated brake means, means for supplying a voltage substantially proportional to the rotational speed of a wheel unit of the vehicle, and means responsive to the voltage delivered by said voltage supply means for preventing application of the dynamic brake means as long as the voltage delivered by the voltage supply means exceeds a certain value and effective during a brake application initiated by the operator controlled means when the voltage supplied by the voltage supply means reduces below said certain value for causing application of the dynamic brake means and the release of the fluid pressure operated brake means.

8. In a propulsion and brake control apparatus for a vehicle having a propulsion motor adapted to function as dynamic brake means and having also fluid pressure operated brake means, the combination of means for causing current to be supplied to said motor to drive the vehicle, means operative when current is not being supplied to the motor for initiating operation of the motor as dynamic brake means and simultaneously causing an application of the fluid pressure operated brake means to be initiated, and governor means responsive to the rotational speed of a wheel unit of the vehicle for controlling the speed of the motor during propulsion and effective during an application of the brakes to prevent the operation of the motor as dynamic brake means as long as the speed of the vehicle exceeds a certain speed.

9. In a propulsion and brake control apparatus for a vehicle having fluid pressure operated brake means and a propulsion motor adapted to function as dynamic brake means, the combination of means for causing current to be supplied to the motor to drive the vehicle, means for initiating an application of the fluid pressure operated brake means and simultaneously therewith causing operation of said motor as dynamic brake means, means for supplying a voltage substantially proportional to the rotational speed of a wheel unit of the vehicle, and voltage responsive means controlled according to the voltage supplied by said voltage supply means effective during propulsion to control the speed of the motor and effective during braking to prevent said motor from exerting a dynamic braking effect until the vehicle reduces below a certain speed.

CLAUDE M. HINES.